United States Patent
Uchida

(10) Patent No.: US 10,454,805 B2
(45) Date of Patent: Oct. 22, 2019

(54) COMMUNICATION SYSTEM, COMMUNICATION APPARATUS, CONTROL APPARATUS, COMMUNICATION APPARATUS CONTROL METHOD AND PROGRAM

(71) Applicant: Satoshi Uchida, Tokyo (JP)

(72) Inventor: Satoshi Uchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 14/385,927

(22) PCT Filed: Mar. 26, 2013

(86) PCT No.: PCT/JP2013/058793
§ 371 (c)(1),
(2) Date: Sep. 17, 2014

(87) PCT Pub. No.: WO2013/146785
PCT Pub. Date: Oct. 3, 2013

(65) Prior Publication Data
US 2015/0043587 A1    Feb. 12, 2015

(30) Foreign Application Priority Data
Mar. 28, 2012 (JP) ................. 2012-074656

(51) Int. Cl.
*H04L 12/751* (2013.01)
*H04L 12/741* (2013.01)
(Continued)

(52) U.S. Cl.
CPC ........... *H04L 45/02* (2013.01); *H04L 41/00* (2013.01); *H04L 45/74* (2013.01); *H04L 45/24* (2013.01);
(Continued)

(58) Field of Classification Search
None
See application file for complete search history.

(56) References Cited

U.S. PATENT DOCUMENTS

| 7,535,896 B2 | 5/2009 | Jo et al. | |
| 2004/0136357 A1* | 7/2004 | Jo .................. | H04L 41/00 370/351 |

(Continued)

FOREIGN PATENT DOCUMENTS

| EP | 1 653 691 A1 | 5/2006 |
| EP | 2 530 886 A1 | 12/2012 |

(Continued)

OTHER PUBLICATIONS

International Search Report (ISR) (PCT Form PCT/ISA/210), in /JP2013/058793, dated Jun. 18, 2013.

(Continued)

*Primary Examiner* — Chi H Pham
*Assistant Examiner* — Raul Rivas
(74) *Attorney, Agent, or Firm* — McGinn IP Law Group, PLLC

(57) ABSTRACT

A communication system includes: a plurality of communication apparatuses that process a received packet(s) based on externally-set communication control information; and a plurality of control apparatuses that set the communication control information in the plurality of communication apparatuses. At least one of the plurality of communication apparatuses includes a control information notification unit that notifies, when a first control apparatus that sets the communication control information in the at least one communication apparatus is replaced by a second control apparatus, the second control apparatus of the communication control information set in the at least one communication apparatus. The second control apparatus takes over control (Continued)

of the at least one communication apparatus by using the notified communication control information.

15 Claims, 33 Drawing Sheets

(51) Int. Cl.
*H04L 12/24* (2006.01)
*H04L 12/801* (2013.01)
*H04L 12/715* (2013.01)
*H04L 12/707* (2013.01)
*H04L 12/803* (2013.01)

(52) U.S. Cl.
CPC ............ *H04L 45/64* (2013.01); *H04L 47/125* (2013.01); *H04L 47/17* (2013.01)

(56) References Cited

U.S. PATENT DOCUMENTS

| | | |
|---|---|---|
| 2006/0092857 A1 | 5/2006 | Ansari et al. |
| 2011/0317701 A1 | 12/2011 | Yamato et al. |
| 2013/0046882 A1 | 2/2013 | Takashima et al. |

FOREIGN PATENT DOCUMENTS

| | | |
|---|---|---|
| JP | 2004-147021 A | 5/2004 |
| JP | 2010-45502 A | 2/2010 |
| JP | 2010-45503 A | 2/2010 |
| JP | 4641794 B2 | 3/2011 |
| WO | WO 2011/065268 A1 | 6/2011 |
| WO | WO 2011/083780 A1 | 7/2011 |
| WO | WO 2011/083786 A1 | 7/2011 |

OTHER PUBLICATIONS

"OpenFlow Switch Specification", Version 1.1.0 Implemented (Wire Protocol 0x02), [online], Feb. 28, 2011, [searched on Feb. 14, 2012], Internet <URL:http://www.openflow.org/documents/openflow-spec-v1.1.0.pdf>.

Sakai, "Feature Article, Evolving Network Virtualization, Software Defined Network OpenFlow and OpenStack", Nikkei Communication, Nov. 1, 2011 issue, pp. 14 to 17.

Koponen et al., "Onix: A Distributed Control Platform for Large-scale Production Networks", [online], USENIX OSDI 2010, Retrieved Oct. 1, 2010, [searched on Feb. 14, 2012], Internet <URL:http://www.usenix.org/event/osdi10/tech/full_papers/Koponen.pdf>.

Extended European Search Report dated Nov. 25, 2015.

Kentaro Ogawa et al: "Fault Management in Functionally Distributed Transport Networking for Large Scale Networks", Intelligent Networking and Collaborative Systems. 2009. INCOS '09. International Conference on. IEEE. Piscataway. NJ. USA. Nov. 4, 2009 (Nov. 4, 2009). pp. 378-382. XP031593131.

Bruno Nunes Astuto et al: "A Survey of Software-Defined Networking: Past. Present. and Future of Programmable Networks". In Submission. Jan. 1, 2013 (Jan. 1, 2013). XP055110892. Retrieved from the Internet: URL:http://hal.inria.fr/hal-00825087.

Japanese Notice of Grounds for Rejection dated Sep. 1, 2015 with an English translation thereof.

Amin Tootoonchian, et.al., "HyperFlow: a Distributed Control Plane for OpenFlow", INM/WREN'10 Proceedings of the 2010 internet network management conference on Research on enterprise networking, Apr. 2010.

* cited by examiner (a) BEFORE TRANSFER OF MANAGEMENT OF PACKET FORWARDING APPARATUS (b) AFTER TRANSFER OF MANAGEMENT OF PACKET FORWARDING APPARATUS

| COMMUNICATION DETERMINATION INFORMATION | FORWARDING RULE IDs |
|---|---|

| PACKET FORWARDING RULE | |
|---|---|
| FORWARDING RULE ID | TARGET PACKET COMMUNICATION TERMINAL ID |

E1-C02

| COMMUNICATION DETERMINATION INFORMATION | FORWARDING RULE ID |
|---|---|

| PACKET FORWARDING RULE | |
|---|---|
| FORWARDING RULE ID | TARGET PACKET COMMUNICATION TERMINAL ID |

(a) INITIAL STATE

FIG. 10    E1-C01

| COMMUNICATION DETERMINATION INFORMATION | FORWARDING RULE IDs |
|---|---|
| E1-CL01=>E1-CL02 | 1,2 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |

E1-C02

| COMMUNICATION DETERMINATION INFORMATION | FORWARDING RULE ID |
|---|---|
| E1-CL01=>E1-CL02 | 1 |

| FORWARDING RULE ID | PACKET FORWARDING RULE | TARGET PACKET COMMUNICATION TERMINAL ID |
|---|---|---|
| 1 | E1-S01{E1-CL01=>E1-CL02}->E1-CL02 | E1-S03 |

(b) WHEN COMMUNICATION FROM E1-CL01 TO E1-CL02 IS SET

| COMMUNICATION DETERMINATION INFORMATION | FORWARDING RULE IDs |
|---|---|
| E1-CL01=>E1-CL02 | 1,2 |
| E1-CL02=>E1-CL01 | 3 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |
| 3 | E1-S04{E1-CL02=>E1-CL01}->E1-CL01 | E1-S02 |

E1-C02

| COMMUNICATION DETERMINATION INFORMATION | FORWARDING RULE ID |
|---|---|
| E1-CL01=>E1-CL02 | 1 |
| E1-CL02=>E1-CL01 | 2,3 |

| FORWARDING RULE ID | PACKET FORWARDING RULE | TARGET PACKET COMMUNICATION TERMINAL ID |
|---|---|---|
| 1 | E1-S01{E1-CL01=>E1-CL02}->E1-CL02 | E1-S03 |
| 2 | E1-CL02{E1-CL02=>E1-CL01}->E1-S04 | E1-S03 |
| 3 | E1-S03{E1-CL02=>E1-CL01}->E1-S02 | E1-S04 |

(c) WHEN COMMUNICATION FROM E1-CL02 TO E1-CL01 IS SET

| COMMUNICATION DETERMINATION INFORMATION | FORWARDING RULE IDs |
|---|---|
| E1-CL01=>E1-CL02 | 1,2,4 |
| E1-CL02=>E1-CL01 | 3,5 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |
| 3 | E1-S04{E1-CL02=>E1-CL01}->E1-CL01 | E1-S02 |
| 4 | E1-S01{E1-CL01=>E1-CL02}->E1-CL02 | E1-S03 |
| 5 | E1-CL02{E1-CL02=>E1-CL01}->E1-S04 | E1-S03 |

E1-C02

| COMMUNICATION DETERMINATION INFORMATION | FORWARDING RULE ID |
|---|---|
| E1-CL01=>E1-CL02 | 1 |
| E1-CL02=>E1-CL01 | 2,3 |

RELATED INFORMATION WILL BE DELETED

| FORWARDING RULE ID | PACKET FORWARDING RULE | TARGET PACKET COMMUNICATION TERMINAL ID |
|---|---|---|
| 1 | ~~E1-S01{E1-CL01=>E1-CL02}->E1-CL02~~ | ~~E1-S03~~ |
| 2 | ~~E1-CL02{E1-CL02=>E1-CL01}->E1-S04~~ | ~~E1-S03~~ |
| 3 | E1-S03{E1-CL02=>E1-CL01}->E1-S02 | E1-S04 |

(d) DURING TRANSFER OF MANAGEMENT OF E1-S03

| COMMUNICATION DETERMINATION INFORMATION | FORWARDING RULE IDs |
|---|---|
| E1-CL01=>E1-CL02 | 1,2,4 |
| E1-CL02=>E1-CL01 | 3,5 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |
| 3 | E1-S04{E1-CL02=>E1-CL01}->E1-CL01 | E1-S02 |
| 4 | E1-S01{E1-CL01=>E1-CL02}->E1-CL02 | E1-S03 |
| 5 | E1-CL02{E1-CL02=>E1-CL01}->E1-S04 | E1-S03 |

E1-C02

| COMMUNICATION DETERMINATION INFORMATION | FORWARDING RULE ID |
|---|---|
| E1-CL02=>E1-CL01 | 3 |

| FORWARDING RULE ID | PACKET FORWARDING RULE | TARGET PACKET COMMUNICATION TERMINAL ID |
|---|---|---|
| 3 | E1-S03{E1-CL02=>E1-CL01}->E1-S02 | E1-S04 |

(e) AFTER TRANSFER OF MANAGEMENT OF E1-S03

| COMMUNICATION DETERMINATION INFORMATION | FORWARDING RULE IDs |
|---|---|
| E1-CL01=>E1-CL02 | 1,2,4 |
| E1-CL02=>E1-CL01 | 3,5 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |
| 3 | E1-S04{E1-CL02=>E1-CL01}->E1-CL01 | E1-S02 |
| 4 | E1-S01{E1-CL01=>E1-CL02}->E1-CL02 | E1-S03 |
| 5 | E1-CL02{E1-CL02=>E1-CL01}->E1-S04 | E1-S03 |

E1-C02

| COMMUNICATION DETERMINATION INFORMATION | FORWARDING RULE ID |
|---|---|
| E1-CL02=>E1-CL01 | 3 |

| FORWARDING RULE ID | PACKET FORWARDING RULE | TARGET PACKET COMMUNICATION TERMINAL ID |
|---|---|---|
| 3 | E1-S03{E1-CL02=>E1-CL01}->E1-S02 | E1-S04 |

(a) INITIAL STATE (AFTER TRANSFER OF MANAGEMENT OF E1-S03)

| COMMUNICATION DETERMINATION INFORMATION | FORWARDING RULE IDs |
|---|---|
| E1-CL01=>E1-CL02 | 1,2,4 |
| E1-CL02=>E1-CL01 | 3,5 |

| FORWARDING RULE ID | PACKET FORWARDING RULE | TARGET PACKET COMMUNICATION TERMINAL ID |
|---|---|---|
| 1 | E1-CL01{E1-CL01=>E1-CL02}->E1-S01 | E1-S02 |
| 2 | E1-S02{E1-CL01=>E1-CL02}->E1-S03 | E1-S01 |
| 3 | E1-S04{E1-CL02=>E1-CL01}->E1-CL01 | E1-S02 |
| 4 | E1-S01{E1-CL01=>E1-CL02}->E1-CL02 | E1-S03 |
| 5 | E1-CL02{E1-CL02=>E1-CL01}->E1-S04 | E1-S03 |

THERE IS NO INFORMATION CORRESPONDING TO FORWARDING RULE ID4

E1-C02

| COMMUNICATION DETERMINATION INFORMATION | FORWARDING RULE ID |
|---|---|
| E1-CL02=>E1-CL01 | 3,5 |

| FORWARDING RULE ID | PACKET FORWARDING RULE | TARGET PACKET COMMUNICATION TERMINAL ID |
|---|---|---|
| 3 | E1-S03{E1-CL02=>E1-CL01}->E1-S02 | E1-S04 |
| 4 | E1-S01{E1-CL01=>E1-CL02}->E1-CL02 | E1-S03 |
| 5 | E1-CL02{E1-CL02=>E1-CL01}->E1-S04 | E1-S03 |

FORWARDING RULES NEWLY ADDED (b) DURING TRANSFER OF MANAGEMENT OF E1-S03 (DURING RESTORATION)

| COMMUNICATION DETERMINATION INFORMATION | FORWARDING RULE IDs |
|---|---|
| E1-C01=>E1-C02 | 1,2 |
| E1-C02=>E1-C01 | 3 |

| FORWARDING RULE ID | PACKET FORWARDING RULE | TARGET PACKET COMMUNICATION TERMINAL ID |
|---|---|---|
| 1 | E1-C01{E1-C01=>E1-C02}->E1-S01 | E1-S02 |
| 2 | E1-S02{E1-C01=>E1-C02}->E1-S03 | E1-S01 |
| 3 | E1-S04{E1-C02=>E1-C01}->E1-C01 | E1-S02 |

E1-C02

| COMMUNICATION DETERMINATION INFORMATION | FORWARDING RULE ID |
|---|---|
| E1-C02=>E1-C01 | 3,5 |
| E1-C01=>E1-C02 | 4 |

| FORWARDING RULE ID | PACKET FORWARDING RULE | TARGET PACKET COMMUNICATION TERMINAL ID |
|---|---|---|
| 3 | E1-S03{E1-C02=>E1-C01}->E1-S02 | E1-S04 |
| 4 | E1-S01{E1-C01=>E1-C02}->E1-C02 | E1-S03 |
| 5 | E1-C02{E1-C02=>E1-C01}->E1-S04 | E1-S03 |

(c) AFTER TRANSFER OF MANAGEMENT OF E1-S03 (AFTER RESTORATION)

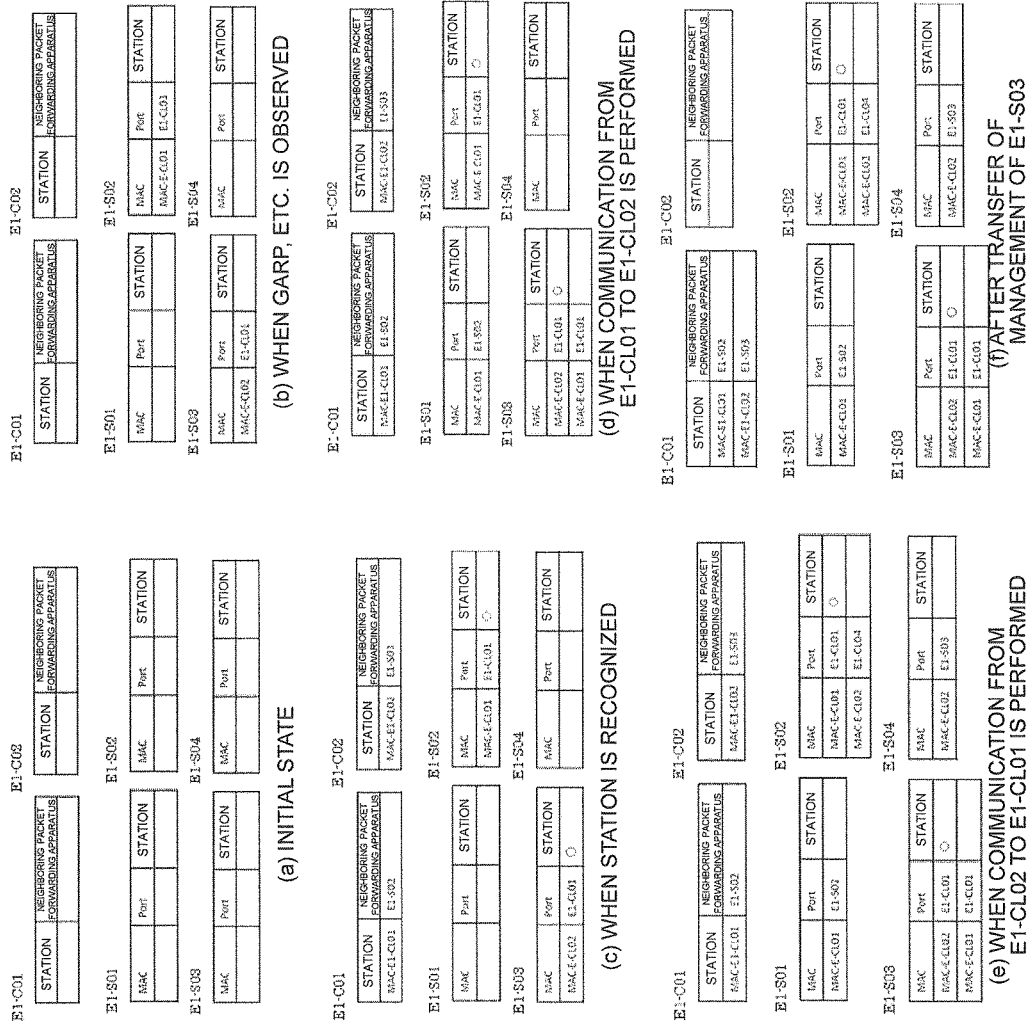

(a) INITIAL MANAGEMENT STATE (BEFORE TRANSFER OF MANAGEMENT OF E21-S02)

(a) INITIAL MANAGEMENT STATE (b) MOVEMENT OF E22-CL02

(c) TRANSFER OF MANAGEMENT OF E22-S04

| COMMUNICATION DETERMINATION INFORMATION | FORWARDING RULE IDs |
|---|---|
| E4-CL01=>E4-CL02 | |

| FORWARDING RULE ID | PACKET FORWARDING RULE | TARGET PACKET COMMUNICATION TERMINAL ID |
|---|---|---|

E4-C02

| COMMUNICATION DETERMINATION INFORMATION | FORWARDING RULE ID |
|---|---|
| | |

| FORWARDING RULE ID | PACKET FORWARDING RULE | TARGET PACKET COMMUNICATION TERMINAL ID |
|---|---|---|

(a) INITIAL STATE

E4-C01

| COMMUNICATION DETERMINATION INFORMATION | FORWARDING RULE IDs |
|---|---|
| E4-CL01=>E4-CL02 | 1,2 |

| FORWARDING RULE ID | PACKET FORWARDING RULE | TARGET PACKET COMMUNICATION TERMINAL ID |
|---|---|---|
| 1 | E4-CL01{E4-CL01=>E4-CL02}=>E4-S01 | E4-S02 |
| 2 | E4-S02{E4-CL01=>E4-CL02}=>E4-S03 | E4-S01 |

E4-C02

| COMMUNICATION DETERMINATION INFORMATION | FORWARDING RULE ID |
|---|---|
| E4-CL01=>E4-CL02 | 1 |

| FORWARDING RULE ID | PACKET FORWARDING RULE | TARGET PACKET COMMUNICATION TERMINAL ID |
|---|---|---|
| 1 | E4-S02{E4-CL01=>E4-CL02}=>E4-S03 | E4-S01 |

(b) AFTER COMMUNICATION IS SET BY E4-C01

E4-C01

| COMMUNICATION DETERMINATION INFORMATION | FORWARDING RULE IDs |
|---|---|
| E4-CL01=>E4-CL02 | 1,2 |

| FORWARDING RULE ID | PACKET FORWARDING RULE | TARGET PACKET COMMUNICATION TERMINAL ID |
|---|---|---|
| 1 | E4-CL01{E4-CL01=>E4-CL02}=>E4-S01 | E4-S02 |
| 2 | E4-S02{E4-CL01=>E4-CL02}=>E4-S03 | E4-S01 |

E4-C02

| COMMUNICATION DETERMINATION INFORMATION | FORWARDING RULE ID |
|---|---|
| E4-CL01=>E4-CL02 | 1,2 |

| FORWARDING RULE ID | PACKET FORWARDING RULE | TARGET PACKET COMMUNICATION TERMINAL ID |
|---|---|---|
| 1 | E4-S02{E4-CL01=>E4-CL02}=>E4-S03 | E4-S01 |
| 2 | E4-S01{E4-CL01=>E4-CL02}=>E4-CL02 | E4-S03 |

(c) AFTER COMMUNICATION IS SET BY E4-C02

COMMUNICATION SYSTEM, COMMUNICATION APPARATUS, CONTROL APPARATUS, COMMUNICATION APPARATUS CONTROL METHOD AND PROGRAM

TECHNICAL FIELD

Reference to Related Application

The present invention is based upon and claims the benefit of the priority of Japanese patent application No. 2012-074656 filed on Mar. 28, 2012, the disclosure of which is incorporated herein in its entirety by reference thereto.

The present invention relates to a communication system, a communication apparatus, a control apparatus, a communication apparatus control method, and a program. In particular, it relates to: a communication system in which a plurality of control apparatuses each of which is capable of controlling communication apparatuses in a centralized manner are arranged; a communication apparatus; a control apparatus; a communication apparatus control method; and a program.

BACKGROUND

Establishment of networks that can freely be controlled, which is referred to as software defined networks (SDN) has been proposed. As a typical example of such SDNs, NPL (Non-Patent Literature) 1 proposes a communication protocol referred to as OpenFlow and basic operations of a packet forwarding apparatus. In OpenFlow, an external communication control apparatus called an OpenFlow controller is arranged, and a packet forwarding rule can externally be set in a packet forwarding apparatus. In this way, the external communication control apparatus can manage communication forwarding control, and a new communication control system can easily be realized through development of an external communication control apparatus.

However, these SDNs have a problem that external communication control apparatuses have load for control determination. Thus, if only one external communication control apparatus is used, it is difficult to manage packet forwarding apparatuses in a centralized manner. Therefore, it is desirable that the load for control determination be distributed. NPL 2 describes a solution to this problem. NPL 2 describes a hop-by-hop system and an overlay system separately. In the hop-by-hop system, an external central manager manages all paths to perform communication management for optimization and adjustment for each purpose. The hop-by-hop system has problems with storage of information about all paths as described and concentration of other packet forwarding setting operations, for example. Thus, a solution to the scalability problem is demanded. In the overlay system, a controller is arranged for each managed group, and a setting between managed groups is deemed and performed as a communication therebetween. In addition, by applying a tunneling technique or the like to a communication between managed groups and managing the communication as a single logical network, the communication between managed groups can also be realized consistently. The overlay system mitigates the scalability problem. However, since the managed targets are abstracted as being nodes in a group, between groups, and the like, it is easily to assume that the same problem will arise as the number of managed targets increases.

To solve the above scalability problem, various systems have been proposed and implemented. NPL 3 describes a technique as one typical example of such systems.

NPL 3 describes an example of the architecture of a communication control system using OpenFlow. Processing components necessary for control are defined and processing of each of the components is also defined. In NPL 3, consideration is given to how information is held for scalability. According to NPL 3, an all-node duplication mechanism and a distributed storage mechanism as typified by a DHT (Distributed Hash Table) are stored among nodes. Information that is important and updated less frequently such as information about switch and link configurations is stored in the all-node duplication mechanism and information updated more frequently such as information about link usage levels is stored in the distributed storage mechanism.

NPL 1
"OpenFlow Switch Specification", Version 1.1.0 Implemented (Wire Protocol 0x02), [online], Feb. 28, 2011, [searched on Feb. 14, 2012], Internet <URL:http://www.openflow.org/documents/openflow-spec-v1.1.0.pdf>.

NPL 2
"Feature Article, Evolving Network Virtualization, Software Defined Network OpenFlow and OpenStack", Nikkei Communication, 2011 Nov. 1 issue, pp. 14 to 17.

NPL 3
"Onix: A Distributed Control Platform for Large-scale Production Networks", [online], USENIX OSDI 2010, Retrieved 2010-10-01, [searched on Feb. 14, 2012], Internet <URL:http://www.usenix.org/event/osdi10/tech/full_papers/Koponen.pdf>.

SUMMARY

The following analysis has been given from a viewpoint of the present invention. However, a system in which a plurality of physical external communication control apparatuses as described above operate as a single logical external communication control apparatus is directed to static load balancing in which management targets are defined. Thus, the system is insufficient regarding fault tolerance of external communication control apparatuses and dynamic load balancing.

For example, OpenFlow allows a plurality of control-communication logic transmission paths referred to as secure channels. If it is clearly determined that connection to an external communication control apparatus cannot be established, connection to another one of a plurality of external communication control apparatuses is sought. Namely, if one of a plurality of physical external communication control apparatuses malfunctions, a packet forwarding apparatus may attempt to connect to another external communication control apparatus. However, NPL 1 does not clearly describe a method of continuing an operation as the system again in such case.

NPL 3 is problematic in that costs are required for duplication of all the important information, for a redundant configuration for allowing the distributed storage mechanism to have fault tolerance as well, and for the duplication thereof.

In addition, to realize dynamic load balancing, a cost is required for transferring data from a source external communication control apparatus to a destination external communication control apparatus. In addition, when dynamic load balancing is performed, it is necessary to clearly perform verification of transfer between packet forwarding apparatuses. If such transfer verification is not performed properly, a packet forwarding rule or the like that is not recognized by an external communication control apparatus could remain.

Thus, it is necessary to perform rule matching processing for matching a packet forwarding rule with an external communication control apparatus as a controller or processing for resetting a switch after temporarily initializing the switch or redoing an operation from re-entry of a switch to the system after recognizing that the switch has not been in the network. In the former case, since load for performing the rule matching processing is required on a packet forwarding apparatus, control power for conventional communication is lost. In the latter case, since a packet forwarding rule is not present while resetting the switch or redoing an operation from the re-entry of the switch, packet forwarding cannot be performed. As a result, the communication can easily be unstable.

To respond to the above problems, it is desirable to perform fault-tolerance processing, load smoothing, control centralization, and so forth while ensuring the scalability of external communication control apparatuses. However, there is a problem with a cost for synchronizing data between external communication control apparatuses. In addition, while a packet forwarding apparatus is matching/resetting a packet forwarding rule, the time for which the communication cannot be performed is prolonged. Thus, there is a problem that the communication becomes unstable.

Therefore, there is a need in the art to provide: a communication system that enables dynamic load balancing by a plurality of control apparatuses and that can contribute to reduction in data synchronization cost and to improvement in communication stability; a communication apparatus; a control apparatus; a communication apparatus control method; and a program.

According to a first aspect, there is provided a communication system, comprising: a plurality of communication apparatuses that process a received packet(s) based on externally-set communication control information; and a plurality of control apparatuses that set the communication control information in the plurality of communication apparatuses. At least one of the plurality of communication apparatuses comprises a control information notification unit that notifies, when a first control apparatus that sets the communication control information in the at least one communication apparatus is replaced by a second control apparatus, the second control apparatus of the communication control information set in the at least one communication apparatus. The second control apparatus takes over control of the at least one communication apparatus by using the notified communication control information.

According to a second aspect, there is provided a communication apparatus, connected to a plurality of control apparatuses setting communication control information in the communication apparatus. The communication apparatus comprises: a packet processing unit that processes a received packet(s) based on communication control information set by at least one of the plurality of control apparatuses; and a control information notification unit that notifies, when the at least one control apparatus, which sets the communication control information in the communication apparatus, is replaced by another control apparatus, the another control apparatus as replaced of the communication control information set in the communication apparatus.

According to a third aspect, there is provided a control apparatus, configured to be connected to a plurality of communication apparatuses processing a received packet(s) based on externally-set communication control information, and configured to take over control of a communication apparatus by using communication control information that is set in the communication apparatus by another control apparatus and notified to the control apparatus by the communication apparatus.

According to a fourth aspect, there is provided a method for controlling a communication apparatus processing a received packet(s) based on externally-set communication control information. The method comprises: by a first control apparatus, setting the communication control information in the communication apparatus; by the communication apparatus, notifying, when the first control apparatus, which sets the communication control information in the communication apparatus, is replaced by a second control apparatus, the second control apparatus of the communication control information set in the communication apparatus; and by the second control apparatus, starting control of the communication apparatus by using the notified communication control information. This method is associated with certain machines, namely, with a communication apparatus processing received packets on the basis of communication control information and control apparatuses controlling this communication apparatus.

According to a fifth aspect, there is provided a program which causes a computer mounted on at least one of the above communication apparatuses and control apparatuses to perform processing to realize each of the above relevant functions. This program can be recorded in a computer-readable (non-transient) storage medium. Namely, the present invention can be embodied as a computer program product.

The present invention provides the following advantage, but not restricted thereto. According to the present invention, it is possible to obtain a configuration that performs dynamic load balancing by a plurality of control apparatuses, excels in data synchronization cost, and maintains stable communication.

BRIEF DESCRIPTION OF DRAWINGS

FIG. 9 is a diagram for illustrating change of communication management information in external communication control apparatuses in the computer network system in FIG. 7 (first specific example).

FIG. 10 is a diagram that follows FIG. 9.

FIG. 11 is a diagram that follows FIG. 10.

FIG. 12 is a diagram that follows FIG. 11.

FIG. 13 is a diagram that follows FIG. 12.

FIG. 14 is a diagram for illustrating change of communication management information in the external communication control apparatuses in the computer network system in FIG. 7 (reverse transfer).

FIG. 15 is a diagram that follows FIG. 14.

FIG. 16 is a diagram that follows FIG. 15.

FIG. 17 is a diagram for illustrating change of communication management information in the external communication control apparatuses in the computer network system in FIG. 7 (second specific example).

FIG. 33 is a diagram for illustrating change of communication management information in external communication control apparatuses in the computer network system in FIG. 32 (first specific example).

PREFERRED MODE

Figure 1:
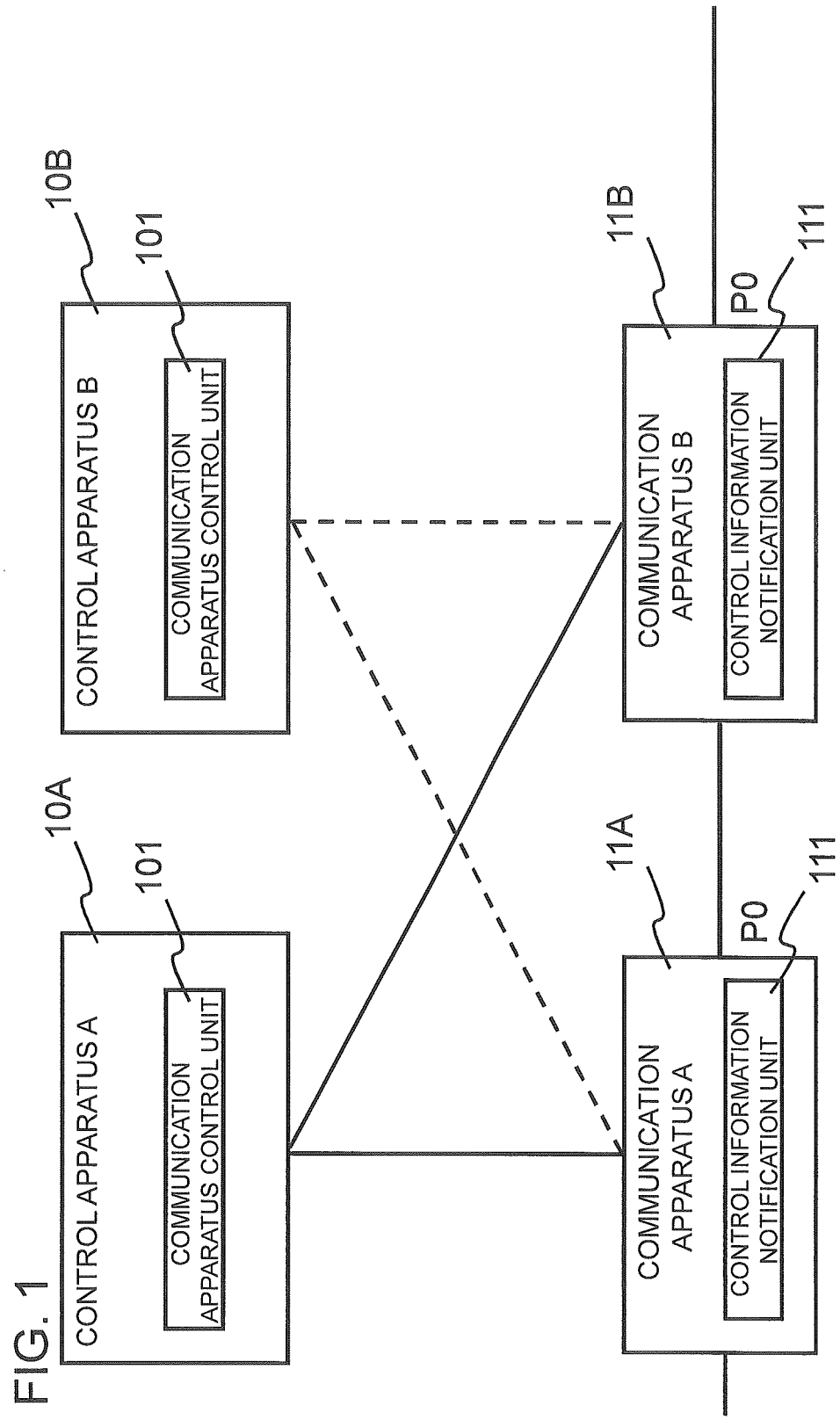
FIG. 1 illustrates a configuration according to an exemplary embodiment of the present invention.

In the present disclosure, there are various possible modes, which include the following, but not restricted thereto. First, an outline of an exemplary embodiment of the present invention will be described with reference to the drawings. In the following outline, various components are denoted by reference characters for the sake of convenience. Namely, the following reference characters are merely used as examples to facilitate understanding of the present invention, not to limit the present invention to the illustrated modes.

As illustrated in FIG. 1, an exemplary embodiment of the present invention can be realized by a configuration comprising a plurality of communication apparatuses 11A and 11B that process a received packet(s) based on externally-set communication control information and a plurality of control apparatuses 10A and 10B that set the communication control information in the plurality of communication apparatuses 11A and 11B. Each of the communication apparatuses 11A and 11B comprises a control information notification unit notifying, when a control apparatus setting the communication control information in its own communication apparatus is switched, the control apparatus of the communication control information that has already been set in its own communication apparatus. The control apparatuses 10A and 10B take over control of the communication apparatuses by using the notified communication control information.

Figure 2:
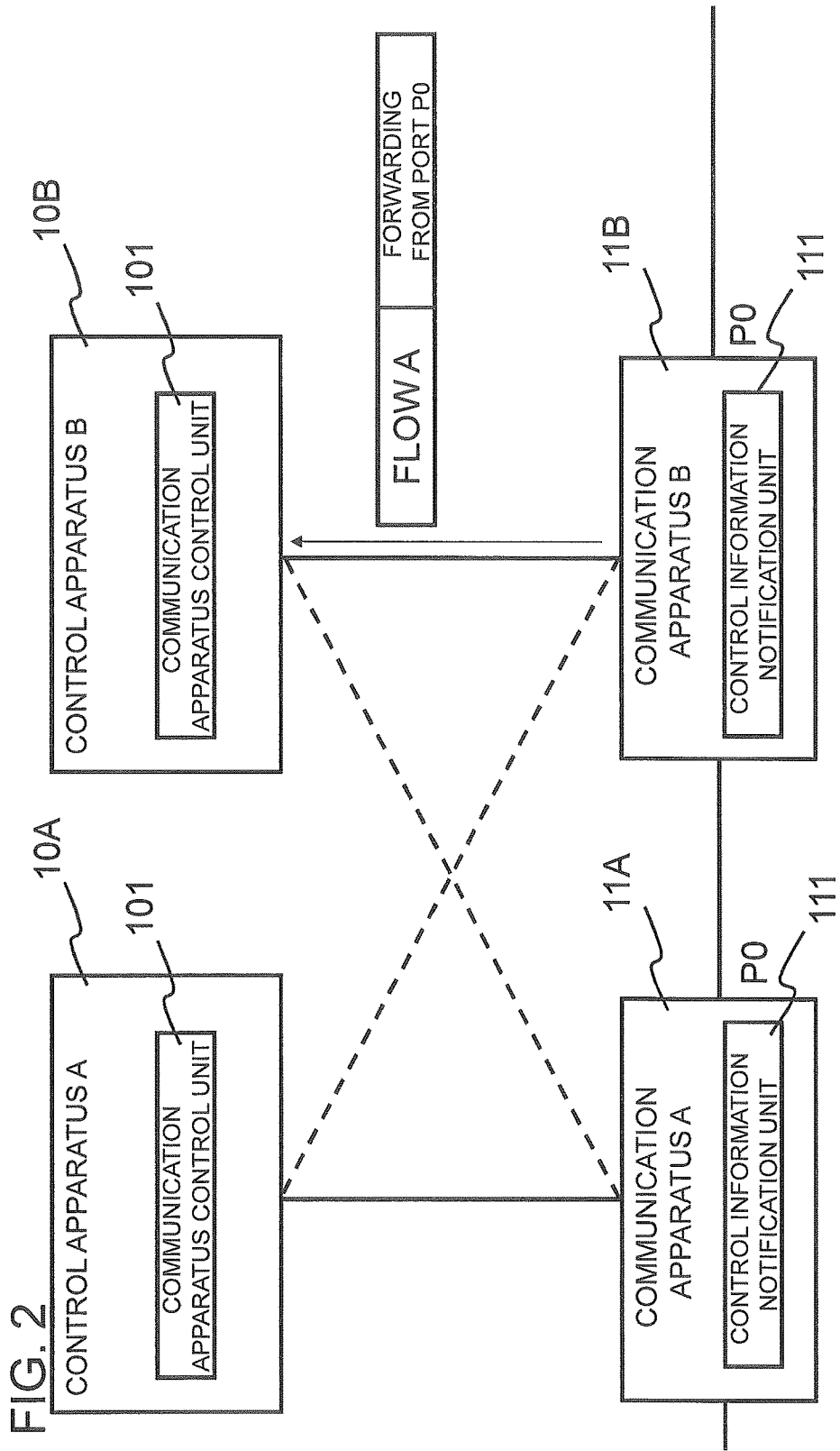
FIG. 2 illustrates an operation according to the exemplary embodiment of the present invention.

For example, an operation change from a state in FIG. 1 to a state in FIG. 2 will be described. While the control apparatus 10A controls both of the communication apparatuses 11A and 11B in FIG. 1, the control apparatus 10A transfers the control of the communication apparatus 11B to the control apparatus 10B in FIG. 2. In such case, as illustrated in FIG. 2, the communication apparatus 11B transmits communication control information ("Forward packets belonging to flow A from port P0" in FIG. 2) to the control apparatus 10B to which control of the communication apparatus 11B has been transferred. The control apparatus 10B uses the communication control information set in the communication apparatus 11B to start controlling the communication apparatus 11B. For example, in the example in FIG. 2, it is seen that the communication control information ("Forward packets belonging to flow A from port P0" in FIG. 2) has already been set, setting communication control information about flow A in the communication apparatus 11B can be omitted. In addition, even if flow B is newly generated, flow B can be managed by rewriting or discarding the communication control information that has already been set in the communication apparatus 11B, for example.

Thus, it is possible to obtain a configuration that can perform dynamic load balancing, excels in data synchronization cost, and maintains stable communication. FIG. 2 illustrates a case in which the control apparatus 10B takes over the control of the communication apparatus 11B from the control apparatus 10A. However, if the control apparatus 10B takes over the control of the communication apparatus 11A, the communication apparatus 11A can be caused to perform the same operation. In addition, if the control apparatus 10B takes over both of the communication apparatuses 11A and 11B from the control apparatus 10A, both of the communication apparatuses 11A and 11B can be caused to perform the same operation.

First Exemplary Embodiment

Figure 3:
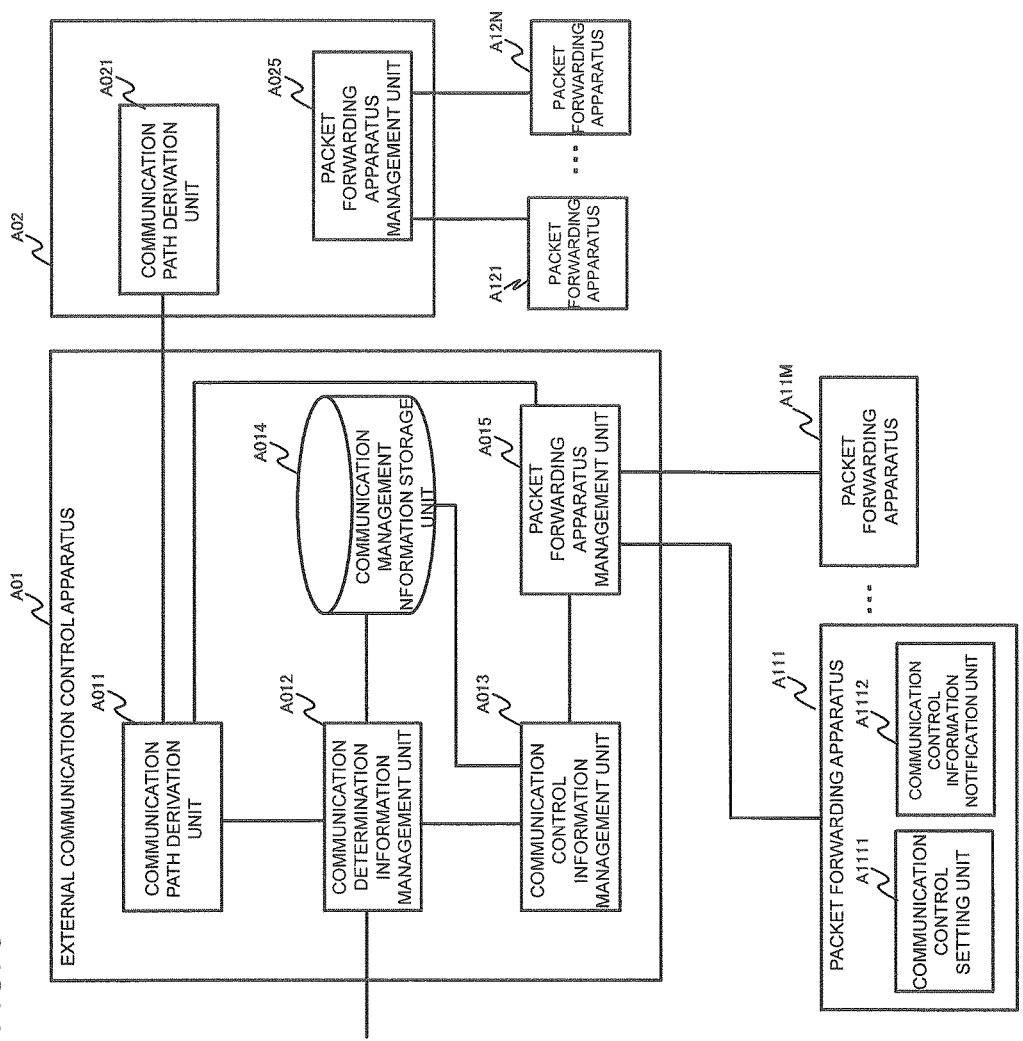
FIG. 3 illustrates a configuration according to a first exemplary embodiment of the present invention.

A first exemplary embodiment of the present invention will be described in detail with reference to the drawings. FIG. 3 illustrates a configuration according to the first exemplary embodiment of the present invention. First, terms will be defined.

"Communication determination information" varies depending on a communication management granularity and corresponds to information representing a certain communication and auxiliary information. For example, the information representing a certain communication is information representing a path between arbitrary communication end terminals. Alternatively, to express a path between arbitrary communication end terminals in an abstract form or to realize a broadcast/multicast communication, the information can be information representing arbitrary information within information about a path between communication end terminals by using a wildcard. Specifically, the information representing a certain communication is a combination of information about a source and information about a destination in a communication layer. More specifically, the information is information that can be expressed by an arbitrary combination of information or mask information among the information that can be expressed in Match Fields in OpenFlow. In addition, the auxiliary information is information necessary for generating the information representing a certain communication or expressing communication characteristics. Examples of the auxiliary information include station information representing a communication end terminal and a Quality of Service (QoS) setting in a communication.

"Communication control information" is information necessary for setting a control content in each apparatus in a communication expressed by the communication determination information. Examples of the communication control information include forwarding rules and QoS settings set in each packet forwarding apparatus. More specifically, examples of the communication control information include flow entries in OpenFlow.

A network system of the present invention includes a plurality of external communication control apparatuses (A01, etc.) and a plurality of packet forwarding apparatuses (A111, etc.). FIG. 3 illustrates two external communication control apparatuses A01 and A02, as an example. In addition, the external communication control apparatuses A01 and A02 manage M packet forwarding apparatuses and N packet forwarding apparatuses, respectively. In FIG. 3, packet forwarding apparatuses A111 to A11M and A121 to A12N are illustrated. For each apparatus, only the minimum processing units that need to be described are illustrated, and these units will be described hereinafter. Unless otherwise described, the following description will be made assuming that the apparatuses of the same kind have the same functions.

The external communication control apparatus A01 includes a communication path derivation unit A011, a communication determination information management unit A012, a communication control information management unit A013, a communication management information storage unit A014, and a packet forwarding apparatus management unit A015.

The communication path derivation unit A011 calculates a necessary communication path on the basis of topology information, a network configuration, or the like and generates communication determination information and communication control information. For example, the communication path derivation unit A011 generates a communication path when a network setting is inputted (preset type) or when a packet that does not match any communication rule is observed (on-demand type). The communication path derivation unit A011 can calculate a communication path in coordination with the communication path derivation unit A021 in the other external communication control apparatus A02, as needed. In addition, the communication path derivation unit A011 can determine a packet forwarding apparatus under the management of the external communication control apparatuses A01 by querying the packet forwarding apparatus management unit A015, as needed.

The communication path derivation unit A011 requests the communication determination information management unit A012 to update the generated communication determination information and communication control information. This "update" signifies adding, overwriting, and deleting of the information.

In addition to a communication path, the communication path derivation unit A011 can also treat auxiliary information necessary for the path as the communication determination information and the communication control information. As defined above, examples of the auxiliary information include station information and QoS setting information.

The communication determination information management unit A012 manages the communication determination information. When requested to set the communication determination information and communication control information generated by the communication path derivation unit A011, the communication determination information management unit A012 updates the communication determination information in the communication management information storage unit A014. Next, the communication determination information management unit A012 notifies the communication control information management unit A013 of the communication control information and the communication determination information as needed and causes the communication control information management unit A013 to select the communication control information to be registered.

When requested to generate communication determination information from extracted communication control information by the communication control information management unit A013, the communication determination information management unit A012 generates communication determination information from the communication control information. The communication determination information may be generated by directly extracting an arbitrary field from a single item of communication control information. For example, when a communication between communication end terminals can be expressed by a single forwarding rule, a necessary field may be extracted from Match Fields in the communication control information in accordance with a management granularity of an external communication control apparatus. In this way, the communication determination information can be extracted. In another example, when station information or the like is supplied, the station information can directly be used as the communication determination information.

When notified of deletion-target communication determination information by the communication control information management unit A013, the communication determination information management unit A012 deletes the deletion-target communication determination information from the communication management information storage unit A014.

When requested to acquire information about a communication by an external terminal, the communication determination information management unit A012 can refer to the communication management information storage unit A014 and supply the information.

On the basis of communication control information, the communication control information management unit A013 selects information that needs to be stored or controlled.

When notified of communication control information by the communication determination information management unit A012, the communication control information management unit A013 acquires the information about packet forwarding apparatuses under the management of the external communication control apparatus A01 from the packet forwarding apparatus management unit A015 and extracts only the information relating to these packet forwarding apparatus under the management from the communication control information. The communication control information management unit A013 stores the extracted communication control information in the communication management information storage unit A014 and sets the information in a corresponding one(s) of the packet forwarding apparatuses A111 to A11M via the packet forwarding apparatus management unit A015. When storing the information in the communication management information storage unit A014, the communication control information management unit A013 may associate the information with corresponding communication determination information.

When notified of communication control information by the packet forwarding apparatus management unit A015, the communication control information management unit A013 searches the communication management information storage unit A014 for related communication determination information. As a result of the search, if the communication control information management unit A013 extracts related communication determination information, the communication control information management unit A013 associates the communication control information with the related communication determination information and stores the communication control information in the communication management information storage unit A014. If, as a result of the search, the communication control information management unit A013 cannot extract any related communication determination information, the communication control information management unit A013 notifies the communication determination information management unit A012 of the communication control information to request to generate communication determination information.

For example, the related communication determination information may be extracted by perfect matching check with a granularity registered in the communication determination information. Namely, identical matching that includes a wildcard setting is performed.

Alternatively, the related communication determination information may be extracted by perfect matching check with an arbitrary identifier registered in the communication determination information or in the communication control information. For example, in OpenFlow, a packet forwarding rule includes a region in which an arbitrary number called Cookie can be added. By associating Cookie with the communication determination information, storing the associated information, and checking Cookie, the communication can be determined.

When notified of removal of a packet forwarding apparatus as a control target by the packet forwarding apparatus management unit, the communication control information management unit A013 extracts and deletes related communication control information from the communication management information storage unit A014. In addition, the communication control information management unit A013 determines whether communication determination information related to the deleted communication control information has other communication determination information. If not, the communication control information management unit A013 notifies the communication determination information management unit A013 of deletion of the communication determination information and causes the communication determination information management unit A012 to delete the communication determination information.

The communication management information storage unit A014 stores information about communication. Namely, the communication management information storage unit A014 stores the communication determination information and the communication management information. The communication management information storage unit A014 can store information in an arbitrary manner so that each processing unit can easily process the information. For example, both types of information may be managed in a single table. Alternatively, a mechanism for accumulating information per type and a mechanism for storing a relationship between both types may be prepared to manage the information.

The packet forwarding apparatus management unit A015 manages the packet forwarding apparatuses controlled by the external communication control apparatus A01. More specifically, the packet forwarding apparatus management unit A015 stores identifiers of the packet forwarding apparatuses that can be connected to and controlled by the external communication control apparatus A01. In addition, when queried by a control unit about a packet forwarding apparatus under the management of the external communication control apparatus A01, the packet forwarding apparatus management unit A015 refers to the identifiers of the packet forwarding apparatuses stored therein and transmits a list of packet forwarding apparatuses or presence or absence of the packet forwarding apparatus being requested.

When notified of and requested to set communication control information by the communication control information management unit A013, the packet forwarding apparatus management unit A015 notifies the related ones of the packet forwarding apparatuses A111 to A11M of the communication control settings and requests the related ones of the packet forwarding apparatuses A111 to A11M to set the communication control settings.

When the packet forwarding apparatuses A111 to A11M are connected, the packet forwarding apparatus management unit A015 requests the packet forwarding apparatuses A111 to A11M to supply communication control information, to extract communication control information that has already been set in the packet forwarding apparatuses. In addition, the packet forwarding apparatus management unit A015 notifies the communication control information management unit A013 of the communication control information supplied from the packet forwarding apparatuses A111 to A11M.

When a packet forwarding apparatus becomes unable to be connected because of disconnection, malfunction, or the like and becomes uncontrollable, the packet forwarding apparatus management unit A015 determines such packet forwarding apparatus through management termination notification, life and death monitoring, or the like. If the packet forwarding apparatus management unit A015 detects an uncontrollable packet forwarding apparatus, the packet forwarding apparatus management unit A015 notifies the communication control information management unit A013 of an identifier of the packet forwarding apparatus as a packet forwarding apparatus that has been removed from under the control of the external communication control apparatus A01.

The packet forwarding apparatus A111 includes a communication control setting unit A1111 and a communication control information notification unit A1112.

When requested to set communication control information by the packet forwarding apparatus management unit A015, the communication control setting unit A1111 stores the communication control information and starts packet forwarding, packet suppression, or the like in accordance with the communication control information. This processing unit performs basic operations of a packet forwarding apparatus that operates in accordance with instructions from an external communication control apparatus in OpenFlow or the like.

In addition, the communication control setting unit A1111 is not limited by existing protocols. The communication control setting unit A1111 includes an arbitrary extension for storing communication control information. For example, the communication control setting unit A1111 may have a new function of storing station determination information in a MAC (Media Access Control) learning table.

When requested to supply communication control information by the packet forwarding apparatus management unit A015, the communication control information notification unit A1112 extracts corresponding communication control information from the information managed thereby and notifies the packet forwarding apparatus management unit A015 of the extracted information. This processing unit performs an operation corresponding or equivalent to a Read State Message in OpenFlow.

In addition, the communication control information notification unit A1112 is not limited by existing protocols. The communication control setting unit A1111 includes an arbitrary extension for extracting communication control information and notifying the packet forwarding apparatus management unit A015 of the extracted communication control information. For example, the communication control setting unit A1111 may have a new function of notifying the packet forwarding apparatus management unit A015 of an entry including station information in a MAC learning table or a MAC learning table including station determination information.

As described above, according to the first exemplary embodiment of the present invention, when a packet forwarding apparatus is connected, the packet forwarding apparatus management unit A015 receives the communication control information that has already been set in the packet forwarding apparatus. In addition, on the basis of the communication control information, the communication control information management unit A013 restores communication determination information and restores a relationship with the communication control information that has already been stored.

Figure 4:
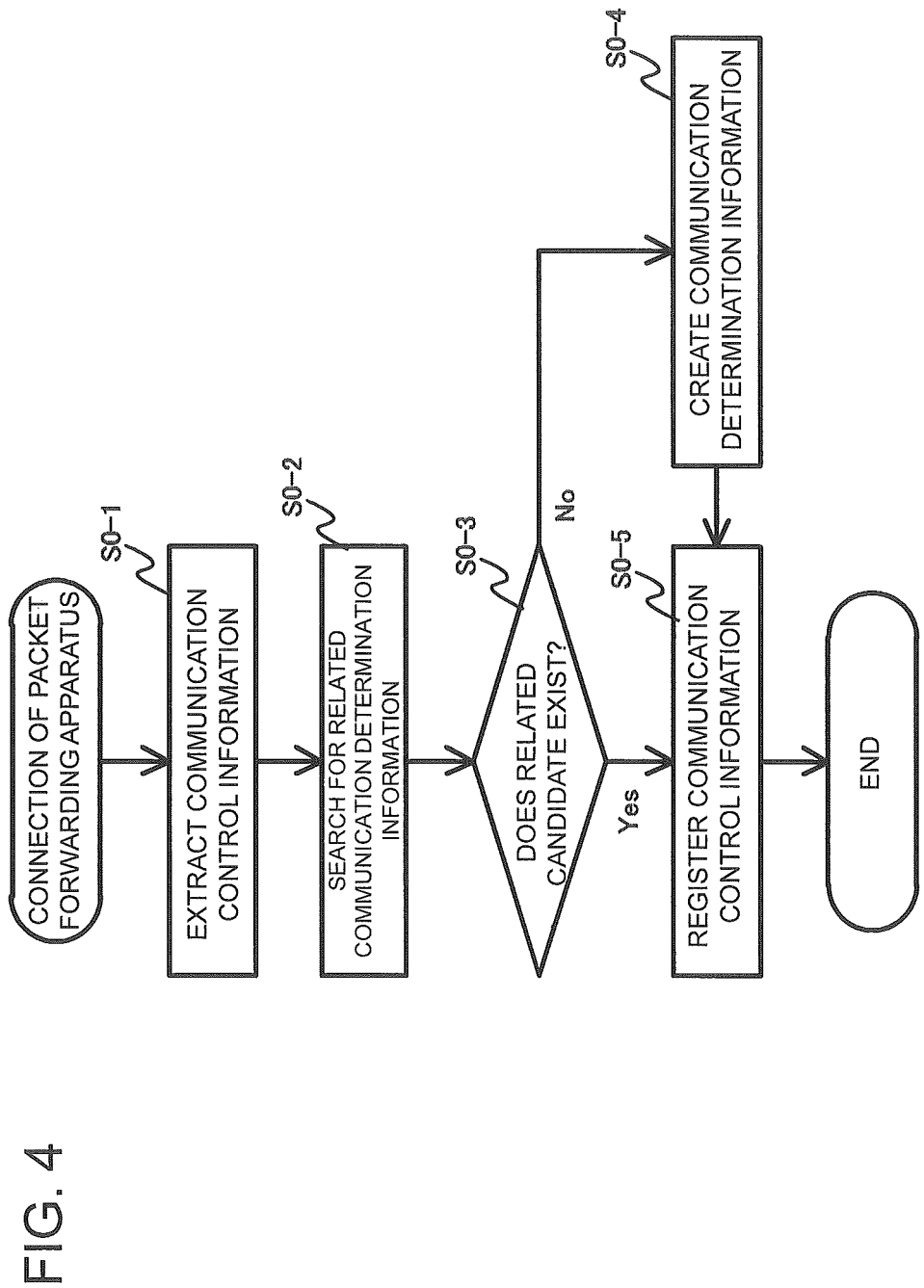
FIG. 4 is a flowchart illustrating an operation of an external communication control apparatus performed when a packet forwarding apparatus is connected according to the first exemplary embodiment of the present invention.

Next, an operation according to the first exemplary embodiment of the present invention will be described with reference to FIGS. 4 to 6. FIG. 4 is a flowchart illustrating an operation of extracting, restoring, and merging communication determination information and communication control information performed by an external communication control apparatus when a packet forwarding apparatus is connected according to the first exemplary embodiment of the present invention.

When the packet forwarding apparatus A111 is connected to and becomes controllable by the external communication control apparatus A01, the present operation is started.

To start managing the packet forwarding apparatus A111, the forwarding apparatus management unit A015 in the external communication control apparatus A01 transmits a communication control information extraction request to the packet forwarding apparatus A111. When receiving the communication control information extraction request, the packet forwarding apparatus A111 transmits communication control information that has already been set in the packet forwarding apparatus from the communication control information notification unit A1112 (step S0-1).

After extracting the communication control information, the packet forwarding apparatus A111 operates under the control of the external communication control apparatus A01. When receiving the extracted communication control information, the packet forwarding apparatus management unit A015 forwards the communication control information to the communication control information management unit A013. The communication control information management unit A013 searches the communication management information storage unit A014 for related communication determination information (a related candidate) (step S0-2).

As a result of the search, if the communication control information management unit A013 determines that the communication management information storage unit A014 does not include any related communication determination information (No in step S0-3), namely, if the external communication control apparatus A01 does not involve the control of the packet, the communication control information management unit A013 notifies the communication determination information management unit A012 of the communication control information and causes the communication determination information management unit A012 to generate communication determination information corresponding to the communication control apparatus. The communication determination information management unit A012 creates communication determination information from the communication control information and registers the created communication determination information in the communication management information storage unit A014. In addition, the communication determination information management unit A012 notifies the communication control information management unit A013 of the creation of the communication determination information (step S0-4).

In contrast, if the communication management information storage unit A014 includes related communication determination information (YES in step S0-3), the communication control information management unit A013 registers the communication control information in the communication management information storage unit A014 (step S0-5). If generation of related communication determination information has already been completed (step S0-4), the communication control information management unit A013 registers communication control information, which is obtained by rewriting the communication determination information in the extracted communication control information with the generated communication determination information, in the communication management information storage unit A014 (step S0-5).

Through the above operation, when a packet forwarding apparatus is connected, the communication control information stored in the packet forwarding apparatus is extracted. Since the external communication control apparatus uses the extracted communication control information to extract, restore, and merge communication determination information and communication control information, the external communication control apparatus can continuously take over the control of the packet forwarding apparatus without having to wait for a communication control information generation request from the packet forwarding apparatus in response to new packet reception (packet observation).

Figure 5:
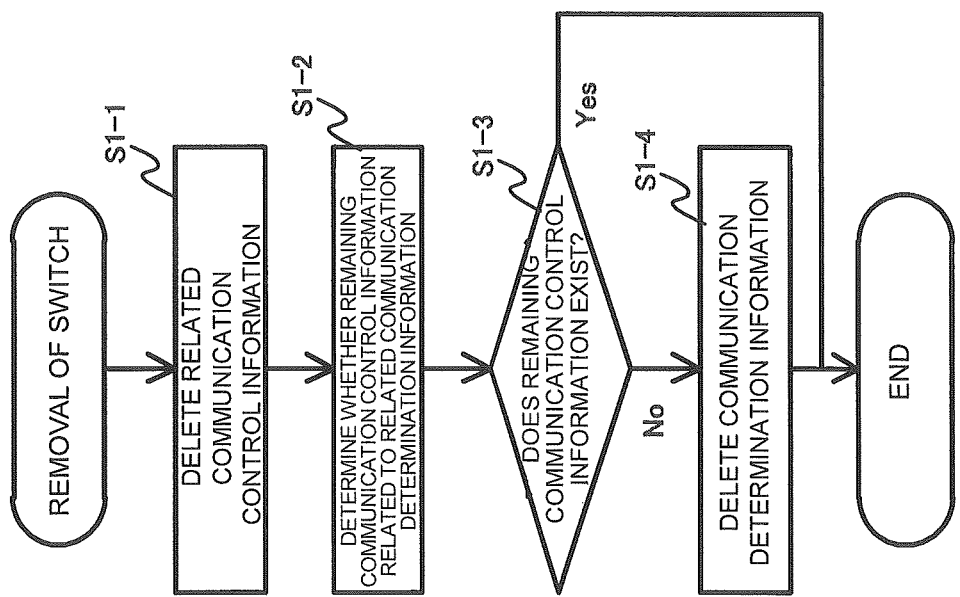
FIG. 5 is a flowchart illustrating an operation of the external communication control apparatus when a packet forwarding apparatus is removed according to the first exemplary embodiment of the present invention.

FIG. 5 is a flowchart illustrating an operation of deleting communication determination information and communication control information performed by the external communication control apparatus when a packet forwarding apparatus is removed according to the first exemplary embodiment of the present invention.

The present procedure is started when the external communication control apparatus determines that a packet forwarding apparatus has been removed from under the management thereof. For example, the present procedure is started when a packet forwarding apparatus is explicitly disconnected or as a result of life and death monitoring performed by the external communication control apparatus.

When a packet forwarding apparatus has been removed, the packet forwarding apparatus management unit A015 determines the packet forwarding apparatus that has been removed from under the management of the external communication control apparatus A01 and notifies the communication control information management unit A013 of an identifier of the packet forwarding apparatus. The communication control information management unit A013 extracts and deletes related communication control information from the communication management information storage unit A014 (step S1-1).

The communication control information management unit A013 refers to the communication management information storage unit A014, and on the basis of the deleted communication control information, extracts communication determination information related to the deleted communication control information. In addition, the communication control information management unit A013 refers to the communication management information storage unit A014 to determine whether communication control information related to the related communication determination information exists (step S1-2).

As a result of the determination, if the communication management information storage unit A014 does not include any related communication control information, the communication control information management unit A013 notifies the communication determination information management unit A012 that no communication determination information related to the communication control information exists (No in step S1-3). The communication determination information management unit A012 deletes the communication determination information from the communication management information storage unit A014 (step S1-4). Absence of the communication control information that shares communication determination information with the communication control information deleted in step S1-1 signifies that the control apparatus no longer needs to control the relevant flow.

Through the above operation, when a packet forwarding apparatus is removed from under the management of an external communication control apparatus, communication determination information and communication control information related to the packet forwarding apparatus is deleted from the external communication control apparatus. In addition, the packet forwarding apparatus removed from under the management of the external communication control apparatus can be removed from the communication management information in the communication management information storage unit A014.

The units (processing means) in the external communication control apparatuses and packet forwarding apparatuses illustrated in FIG. 2 can be realized by computer programs that cause computers implemented on these apparatuses to use hardware thereof and to perform the above processing, respectively.

Figure 6:
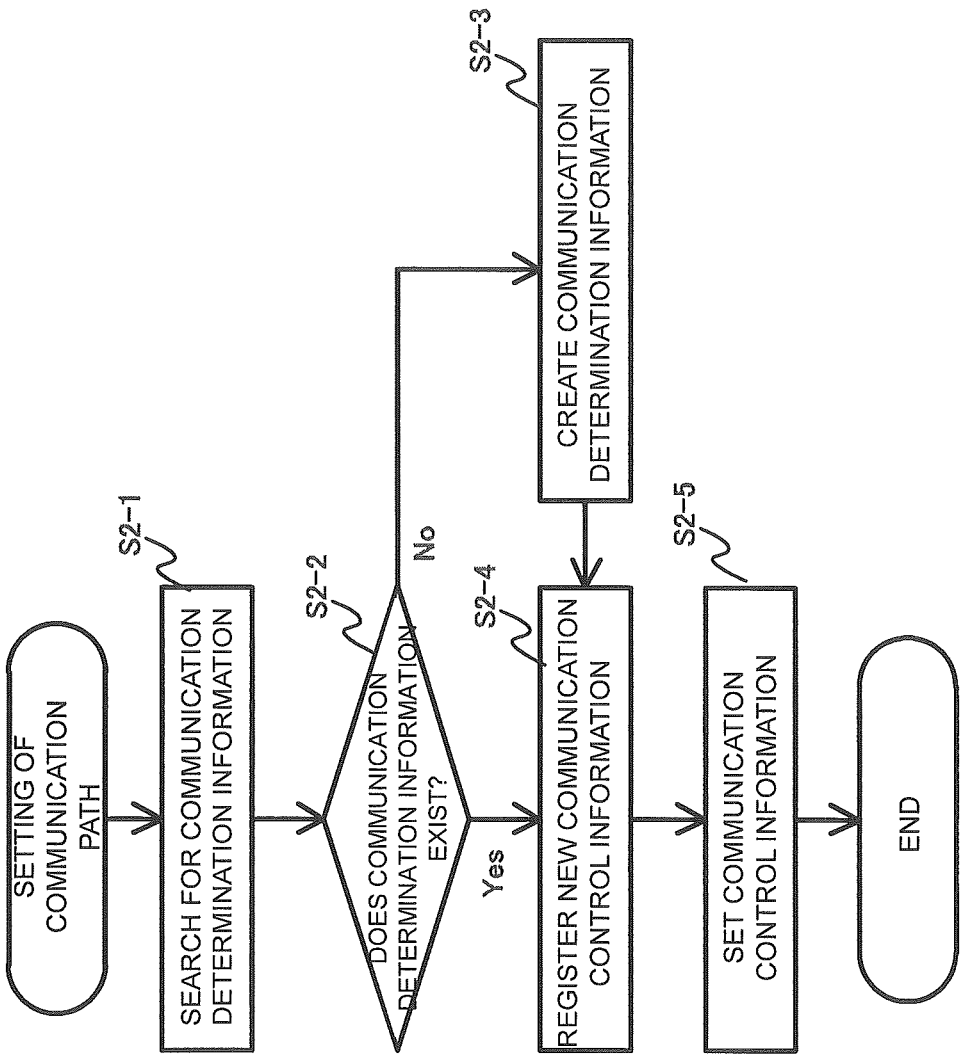
FIG. 6 is a flowchart illustrating an operation of setting a communication path performed by the external communication control apparatus when a communication path is calculated according to the first exemplary embodiment of the present invention.

FIG. 6 is a flowchart illustrating an operation of setting a communication path performed when a communication path is calculated according to the first exemplary embodiment of the present invention.

The present procedure is started when a packet that does not match any existing setting is observed or when path design information is inputted and when the communication path derivation unit A011 requests setting of a communication path.

For a new communication path, the communication path derivation unit A011 generates communication determination information and communication control information including the communication determination information and notifies the communication determination information management unit A012 of the generated information. The communication determination information management unit A012 searches the communication management information storage unit A014 for the same communication determination information as the supplied communication determination information (step S2-1).

If the communication management information storage unit A014 does not include the same communication determination information (No in step S2-2), the communication determination information management unit A012 registers the supplied communication determination information in the communication management information storage unit A014 (step S2-3).

In contrast, if the communication management information storage unit A014 includes the same communication determination information (YES in step S2-2) or if the supplied communication determination information is newly registered (after step S2-3), the communication determination information management unit A012 notifies the communication control information management unit A013 of the communication control information including the communication determination information. On the basis of the supplied communication control information, the communication control information management unit A013 acquires information about packet forwarding apparatuses under the management of the external communication control apparatus A01 from the packet forwarding apparatus management unit A015 by sending a query. In addition, the communication control information management unit A013 registers the communication control information about these packet forwarding apparatuses in the communication management information storage unit A014 (step S2-4).

The communication control information management unit A013 notifies the packet forwarding apparatus management unit A015 of the registered communication control information. The packet forwarding apparatus management unit A015 selects a target packet forwarding apparatus(es) (at least one of A111 to A11M) on the basis of the supplied communication control information and notifies the target packet forwarding apparatus(es) of corresponding communication control information. The communication control setting unit A1111 in the target packet forwarding apparatus A111 (the present description assumes that the setting target is the packet forwarding apparatus A111) stores the supplied communication control information and starts forwarding packets in accordance with the communication control information (step S2-5).

Through the above operation, updating and setting of communication management information performed when a communication path is calculated can be realized.

Through the above three basic operations, external communication control apparatuses managing packet forwarding apparatuses control communication, mange management information, and reset relevant packet forwarding apparatuses via the packet forwarding apparatuses. Namely, without information forwarding between external communication control apparatuses, the management information can be restored and transferred. In this way, advantageous effects of the present invention solving the problems can be obtained.

As described above, according to the present exemplary embodiment, load required for information sharing between external communication control apparatuses can be reduced. This is because information can be supplied via a packet forwarding apparatus. Thus, for example, there is no need to previously transfer management information to an external communication control apparatus to which management could be transferred next (first advantageous effect).

In addition, according to the present exemplary embodiment, it is possible to improve the stability of a communication that is generated when external communication control apparatuses are switched. This is because communication control information that has already been set in a packet forwarding apparatus is treated as accurate information and is not reset. Namely, continuity of a communication can be realized (second advantageous effect).

In addition, according to the present exemplary embodiment, it is possible to perform an operation in which the independency between external communication control apparatuses is increased. This is because information can be supplied via a packet forwarding apparatus. There is no need to determine an external communication control apparatus to which management could be transferred next. By allowing a packet forwarding apparatus to autonomously connect to an external communication control apparatus that can manage the packet forwarding apparatus, transfer of the management can be achieved while maintaining the communication setting that has already been set. In addition, with these advantageous effects, the independency of the external communication control apparatuses is increased and the scalability of the external communication control apparatuses is improved (third advantageous effect).

First Exemplary Embodiment

Specific Example 1

Next, the above first exemplary embodiment will be described in detail on the basis of a specific configuration.

Figure 7:
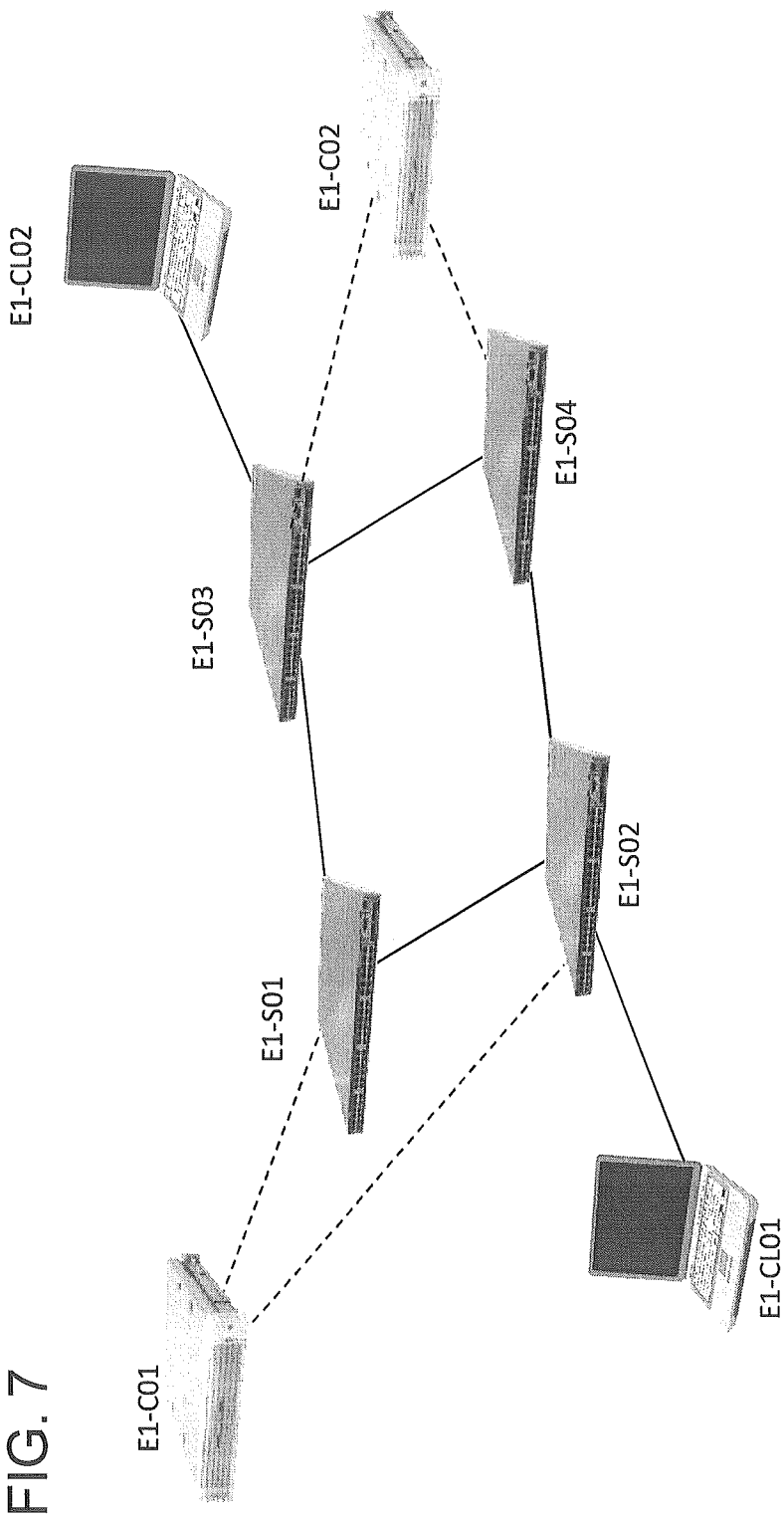
FIG. 7 illustrates a configuration of a computer network system corresponding to the first exemplary embodiment of the present invention.

FIG. 7 illustrates a configuration of a computer network system corresponding to the first exemplary embodiment of the present invention. In the following description, a series of items of management information stored in external communication control apparatuses will be referred to as "communication management information" and communication control information as "a packet forwarding rule(s)."

As illustrated in FIG. 7, two external communication control apparatuses E1-C01, E1-C02, four packet forwarding apparatuses E1-S01 to E1-S04, and two communication terminals E1-CL01, E1-CL02 are arranged. Each solid line represents a network connection relationship and each dashed line represents a management relationship between an external communication control apparatus and a packet forwarding apparatus. In addition, the following description will be made assuming that the external communication control apparatuses E1-C01 and E1-C02 can perform minimum coordination and create a communication path.

Figure 8:
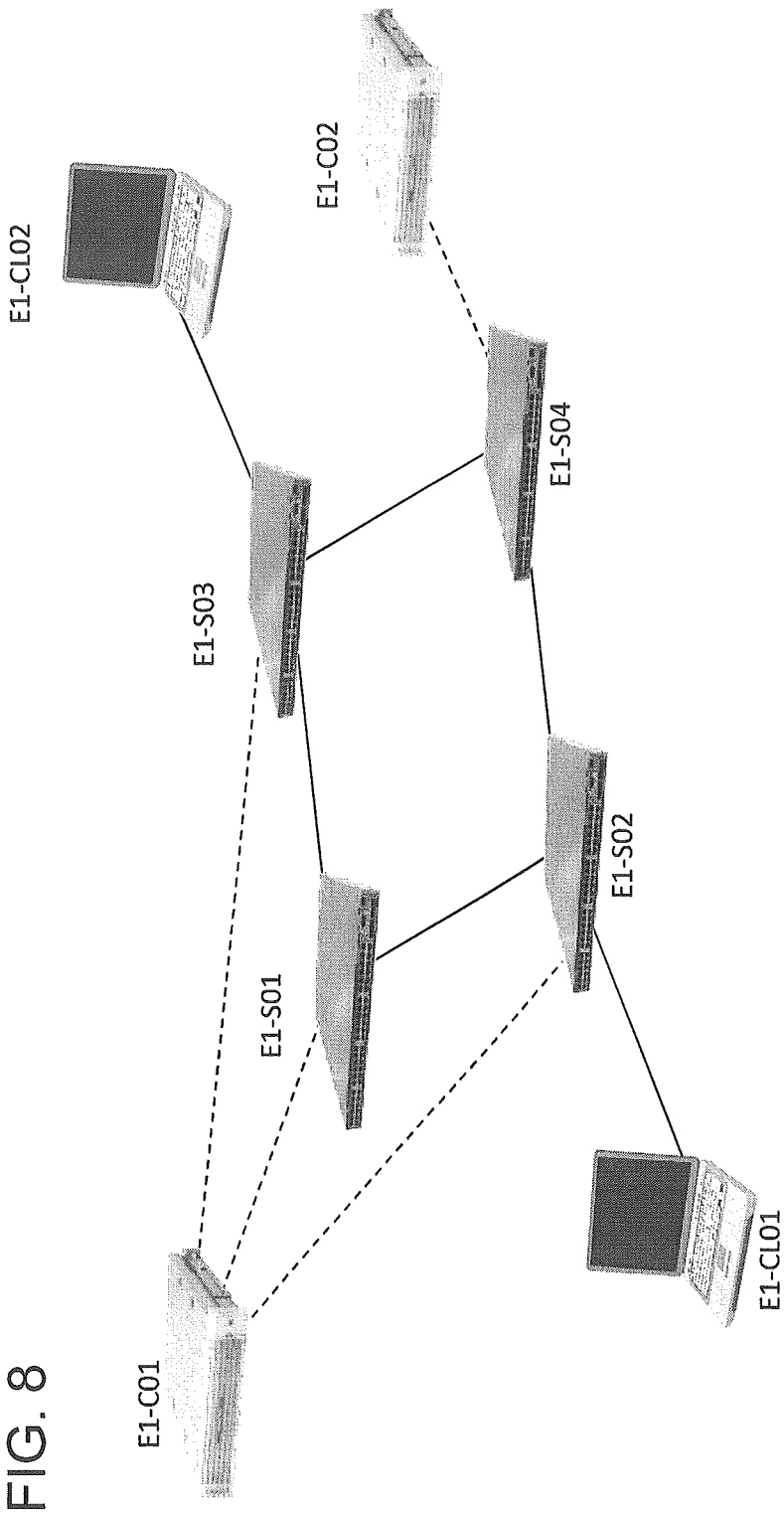
FIG. 8 illustrates a state in which an external communication control apparatus managing a packet forwarding apparatus E1-S03 is switched in the computer network system in FIG. 7.

FIG. 7 illustrates an initial state. FIG. 8 illustrates a state in which the management of the packet forwarding apparatus E1-S03 has been transferred from the external communication control apparatus E1-C02 to the external communication control apparatus E1-C01 for the purpose of concentrated management or in response to disconnection of a management NW (network), for example. In addition, the following description will be made assuming that a hop-by-hop path setting is performed. In this setting, a communication path is set when a communication is generated.

FIG. 9 to FIG. 13 illustrate change of the communication management information in this example. In the following description, communication determination information will be represented by End-to-End information, for example, by a combination of client identifiers. For example, a communication from communication terminal A to communication terminal B will be represented by "A=>B." In addition, regarding path information, in the case of the communication determination information A=>B, a rule that a packet forwarding apparatus X receives a packet from an apparatus Y and forwards the packet to an apparatus Z will be represented by "Y (A=>B)→Z." In addition, if a setting-target packet forwarding apparatus needs to be clarified, the rule will be represented by "X: Y (A=>B)→Z." In addition, when a single communication path realized by a collection of these forwarding rules is represented, if a packet is transferred through apparatuses K, N, M, and L in this order, the path will simply be represented by "K→N→M→L."

In an initial state, since no communication has been generated, no communication determination information exists. Thus, no communication management information is stored as illustrated in FIG. 9.

When the communication terminal E1-CL01 starts communicating with the communication terminal E1-CL02, the communication path derivation unit A011 in the external communication control apparatus E1-C01 and the communication path derivation unit in the external communication control apparatus E1-C02 calculate a path between the communication terminals E1-CL01 and E1-CL02. For example, Dijkstra's algorithm may be used to calculate the path. The following description will be made assuming that E1-CL01→E1-S02→E1-S01→E1-S03→E1-CL02 has been calculated. The communication path derivation unit A011 notifies the communication determination information management unit A012 of the communication determination information E1-CL01=>E1-CL02 and the path information E1-CL01→E1-S02→E1-S01→E1-S03→E1-CL02 obtained by the communication path derivation unit A011 in the external communication control apparatus E1-C01.

The communication determination information management unit A012 refers to the communication management information storage unit A014 and searches for the communication determination information E1-CL01=>E1-CL02 (see step S2-1 in FIG. 6). At this point, as illustrated in FIG. 9, the communication determination information does not exist. Thus, the communication determination information management unit A012 registers the communication determination information E1-CL01=>E1-CL02 in the communication management information storage unit A014 (step S2-3 in FIG. 6). The communication determination information management unit A012 notifies the communication control information management unit A013 of the path information E1-CL01→E1-S02→E1-S01→E1-S03→E1-CL02 and requests registration of new communication control information.

The communication control management unit A013 queries the packet forwarding apparatus management unit A015 and recognizes that the packet forwarding apparatuses E1-S01 and E1-S02 are managed by the external communication control apparatuses E1-C01. After checking this, the communication control management unit A013 generates and stores communication control information E1-S02: E1-CL01 (E1-CL01=>E1-CL02)→E1-S01 and E1-S01: E1-S02 (E1-CL01=>E1-CL02)→E1-S03 in the "packet forwarding rule" fields in the communication management information (see FIG. 10). In addition, to associate the stored packet forwarding rules with the communication determination information, the communication control management unit A013 registers forwarding rule IDs in the communication determination information E1-CL01=>E1-CL02 (step S2-4 in FIG. 6).

The communication control information management unit A013 notifies the packet forwarding apparatus management unit A015 of the registered communication control information E1-S02: (E1-CL01=>E1-CL02)→E1-S01 and E1-S01: E1-S02 (E1-CL01=>E1-CL02)→E1-S03. The packet forwarding apparatus management unit A015 notifies the packet forwarding apparatuses of the respective communication control information and causes the communication control setting unit A1111 to start communication control (step S2-5 in FIG. 6).

Thus, the communication control information including the communication determination information is added to the external communication control apparatus E1-C01 (see the upper portion in FIG. 10). In addition, communication control settings are made on the packet forwarding apparatuses E1-S01 and E1-S02 under the management of the external communication control apparatuses E1-C01 and the corresponding communication is outputted to the packet forwarding apparatus E1-S03 via the packet forwarding apparatuses E1-S02 and E1-S01.

Likewise, communication determination information and communication control information is registered in the external communication control apparatus E1-C02 (see the lower portion in FIG. 10). In addition, likewise, necessary settings are made on the packet forwarding apparatuses E1-S03 and E1-S04 under the management of the external communication control apparatus E1-C02. In this way, the corresponding communication is inputted from the packet forwarding apparatus E1-S01, passes through the packet forwarding apparatus E1-S03, and is forwarded to the communication terminal E1-CL02.

Normally, communication is performed bi-directionally in many cases. Next, a reverse-direction communication E1-CL02=>E1-CL01 will be described. In this case, the communication path derivation unit A011 in the external communication control apparatus E1-C01 and the communication path derivation unit in the external communication control apparatus E1-C02 calculate a communication path in this communication direction. This case will be described assuming that a communication path not being used has been selected for load balancing. More specifically, a path E1-CL02→E1-S03→E1-S04→E1-S02→E1-CL01 has been calculated. For this communication path, the same registration and setting processing as that performed for the communication path E1-CL01=>E1-CL02 is performed. FIG. 11 illustrates the resulting communication management information. In the same way as the forward-direction path, communication control information for realizing the path is set in each of the packet forwarding apparatuses, and as a result, the reverse-direction communication path is established.

Next, a case in which the apparatus managing the packet forwarding apparatus E1-S03 is changed from the external communication control apparatus E1-C02 to the external communication control apparatus E1-C01 because of a malfunction of the management communication path or because of load smoothing will be described.

The packet forwarding apparatus management unit A015 in the external communication control apparatus E1-C01 detects addition of the packet forwarding apparatus E1-S03. The packet forwarding apparatus management unit A015 requests the packet forwarding apparatus E1-S03 to extract communication control information. The packet forwarding apparatus E1-S03 extracts E1-S01 (E1-CL01=>E1-CL02)→E1-CL02 and E1-CL02 (E1-CL02=>E1-CL01)→E1-S04 as the communication control information and transmits the communication control information to the packet forwarding apparatus management unit A015 (step S0-1 in FIG. 4).

The packet forwarding apparatus management unit A015 notifies the communication control information management unit A013 of the received communication control information and requests registration of the information. The communication control information management unit A013 extracts communication determination information E1-CL01=>E1-CL02 and E1-CL02=>E1-CL01 from the communication control information E1-S01 (E1-CL01=>E1-CL02)→E1-CL02 and E1-CL02 (E1-CL02=>E1-CL01)→E1-S04, respectively, and searches the communication management information storage unit A014 for the communication determination information E1-CL01=>E1-CL02 and E1-CL02=>E1-CL01 (step S0-2 in FIG. 4). In this case, since both of the information is registered, the related communication determination information is associated and the communication control information is registered in the communication management information storage unit A014 (YES in step S0-3 to step S0-5 in FIG. 4). In this way, the communication management information in the external communication control apparatus E1-C01 is changed as illustrated in FIG. 12 and maintained. Finally, the communication management information is changed as illustrated in FIG. 13.

From the above processing, it is seen that the communication control information is added to the external communication control apparatus E1-C01 without performing direct transfer of the communication information between the external communication control apparatuses E1-C01 and E1-C02. In addition, it is seen that the new external communication control apparatus and the transferred packet forwarding apparatus have the matching control information without performing communication control resetting operations and the like on the original communication.

The packet forwarding apparatus management unit A015 in the external communication control apparatus E1-C02 detects removal of the packet forwarding apparatus E1-S03 by performing life and death monitoring or the like simultaneously with the detection of the addition of the packet forwarding apparatus E1-S03 by the above external communication control apparatus E1-C01.

The packet forwarding apparatus management unit A015 in the external communication control apparatus E1-C02 notifies the communication control information management unit A013 of removal of the packet forwarding apparatus E1-S03. The communication control information management unit A013 deletes the communication control information E1-S03: E1-S01 (E1-CL01=>E1-CL02)→E1-CL02 and E1-S03: E1-CL02 (E1-CL02=>E1-CL01)→E1-S04 related to the packet forwarding apparatus E1-S03 and also deletes information related to the communication control information (step S1-1 in FIG. 5). Each strike-through in FIG. 12 represents communication control information to be deleted by the above deletion processing.

The communication control information management unit A013 detects E1-CL01=>E1-CL02 as the communication determination information that does not have any related communication control information (step S1-2 to No in S1-3 in FIG. 5). The communication control information management unit A013 requests the communication determination information management unit A012 to delete the communication determination information E1-CL01=>E1-CL02 that does not have any related communication control information. The communication determination information management unit A012 deletes the communication determination information from the communication management information storage unit A014 (step S1-4 in FIG. 5). As a result, the communication management information is updated as illustrated in FIG. 13.

From the above processing, it is seen that the external communication control apparatus E1-C02 can remove information about the packet forwarding apparatus E1-S03 that has been removed from under the management thereof and can remove the unnecessary communication determination information E1-CL01=>E1-CL02.

From the above 2 processing, it is seen that the whole system can continue to operate as if the system had been operating in the original manner, without performing direct transfer of communication information between the external communication control apparatuses E1-C01 and E1-C02 and without performing communication control resetting operations and the like on the original communication. In this way, the communication can continuously be performed, for example, without resetting the communication control of the packet forwarding apparatuses performing the communication. In addition, in terms of transferring the management, the management can be transferred without causing the external communication control apparatuses to coordinate with each other.

Next, an operation of restoring the state in FIG. 7 from the state in FIG. 8 will be described. FIGS. 14 to 16 illustrate change of the communication management information in the process of the operation. As in the change from the state in FIG. 7 to the state in FIG. 8, the external communication control apparatus E1-C01 deletes the information about the packet forwarding apparatus E1-S03. Next, the operation will be described sequentially.

The packet forwarding apparatus management unit A015 in the external communication control apparatus E1-C02 detects addition of the packet forwarding apparatus E1-S03. The packet forwarding apparatus management unit A015 transmits a communication control information extraction request to the packet forwarding apparatus E1-S03. The packet forwarding apparatus E1-S03 extracts E1-S01 (E1-CL01=>E1-CL02)→E1-CL02 and E1-CL02 (E1-CL02=>E1-CL01)→E1-S04 as the communication control information and transmits the communication control information to the packet forwarding apparatus management unit A015 (step S0-1 in FIG. 4).

The packet forwarding apparatus management unit A015 notifies the communication control information management unit A013 of the received communication control information and requests registration of the communication control information. The communication control information management unit A013 extracts communication determination information E1-CL01=>E1-CL02 and E1-CL02=>E1-CL01 from the communication control information E1-S01(E1-CL01=>E1-CL02)→E1-CL02 and E1-CL02 (E1-CL02=>E1-CL01)→E1-S04, respectively, and checks whether the communication management information storage unit A014 includes the communication determination information (step S0-2 in FIG. 4).

In this case, as illustrated in FIG. 15, the communication management information storage unit A014 in the external communication control apparatus E1-C02 does not include the communication determination information E1-CL01=>E1-CL02. Thus, the communication control information management unit A013 requests the communication determination information management unit A012 to create the communication determination information E1-CL01=>E1-CL02 (No in step S0-3 in FIG. 4). The communication determination information management unit A012 creates the communication determination information E1-CL01 E1-CL02 (step S0-4 in FIG. 4).

In addition, the communication determination information management unit A012 notifies the communication control information management unit A013 of completion of the registration. The communication control information management unit A013 registers the communication control information E1-S01 (E1-CL01=>E1-CL02)→E1-CL02 and E1-CL02 (E1-CL02=>E1-CL01)→E1-S04 in the communication management information storage unit A014. As a result, the communication management information is changed as illustrated in FIG. 16.

FIG. 16 illustrates the same communication management information as that illustrated in FIG. 11. In this way, even when the state in FIG. 7 is restored from the state in FIG. 8, it is seen that the communication control information is appropriately restored by the external communication control apparatus.

First Exemplary Embodiment

Specific Example 2

Next, the first exemplary embodiment will be described in detail on the basis of another specific configuration. In this specific example, station information is stored in a MAC learning table. In this example, the communication determination information is station information and the communication control information is a relationship between the station information and a neighboring packet forwarding apparatus.

FIG. 17 illustrates change of the communication management information in the external communication control apparatuses E1-C01 and E1-C02 and change of the MAC learning tables in the packet forwarding apparatuses E1-S01 to E1-S04 when the state in FIG. 7 is changed to the state in FIG. 8.

In the following description, an item of station information is represented by a MAC (Media Access Control) address such as by "MAC-X" (X is a terminal identifier). Namely, a MAC address of the communication terminal E1-CL01 is represented by MAC-E1-CL01. Port identifiers in the MAC learning table are represented as identifiers of connected terminals.

When the communication terminals E1-CL01 and E1-CL02 are connected to each other, the packet forwarding apparatuses E1-S02 and E1-S03 perform the first MAC learning on the basis of an initial identification protocol or the like such as the Gratuitous ARP (Address Resolution Protocol). FIG. 17(b) illustrates a state in which the first MAC learning has completed by the packet forwarding apparatuses E1-S02 and E1-S03.

In the above MAC learning, connection information is supplied to the external communication control apparatuses E1-C01 and E1-C02 and recognized as station information. On the basis of the station information, the external communication control apparatuses store the station information, communication control information including the station information, and a connection relationship between a station and a packet forwarding apparatus in the communication management information storage unit A014, as is the case with the operation of setting a communication path. In addition, the external communication control apparatuses store station determination (◯) for each of the packet forwarding apparatuses E1-S02 and E1-S03. For example, information representing that "the station MAC-E1-CL01 is connected to the packet forwarding apparatus E1-S02" is stored in the external communication control apparatus E1-C01, and a station mark (o) is indicated in the MAC learning table corresponding to the packet forwarding apparatus. FIG. 17(c) illustrates a state in which recognition of the above station is completed.

Next, a communication from the communication terminal E1-CL01 to E1-CL02 is started, and settings for forwarding the communication are made. Once the communication is started, the packet forwarding apparatuses E1-S01 and E1-S03 also newly perform MAC learning. FIG. 17(d) illustrates a state in which the MAC learning has been performed after the communication from the communication terminal E1-CL01 to E1-CL02 is started.

Next, a communication in the reverse direction, namely, a communication from the communication terminal E1-CL02 to E1-CL01, is started, and settings for forwarding the communication are made. Once the communication is started, the packet forwarding apparatuses E1-S02 and E1-S04 also newly perform MAC learning. FIG. 17(e) illustrates a state in which the MAC learning has been performed after the communication from the communication terminal E1-CL02 to E1-CL01 is started.

Finally, the management of the packet forwarding apparatus E1-S03 is transferred from the external communication control apparatus E1-C02 to E1-C01. The external communication control apparatus E1-C01 receives a response (communication control information including a station mark (o)) from the packet forwarding apparatus E1-S03 and recognizes that the packet forwarding apparatus E1-S03 is connected to the MAC-E1-CL02 as the station. The external communication control apparatus E1-C01 adds the communication determination information (station information) and a relationship with neighboring packet forwarding apparatuses to the communication management information storage unit A014.

Meanwhile, the external communication control apparatus E1-C02 deletes the corresponding communication determination information (station information) and the neighboring packet forwarding apparatuses, in response to the removal of the packet forwarding apparatus E1-S03 that has been under the management of the external communication control apparatus E1-C02. FIG. 17(f) illustrates a state in which the transfer of the packet forwarding apparatus E1-S03 is completed.

As described above, it is seen that, auxiliary information and control information about a communication path can be extracted and restored via a packet forwarding apparatus, other than communication path settings. In addition, by associating such information with a MAC learning table or the like, the information can be stored and controlled with conventional MAC learning. Namely, reduction in storage region and improvement in information accuracy can be achieved. For example, the present example only requires extension of the region for station determination information in each MAC learning table. In addition, if information is forgotten in MAC learning, it is highly probable that no station exists there. Thus, such inaccurate and unnecessary information can be deleted at the time of transfer.

Second Exemplary Embodiment

Figure 18:
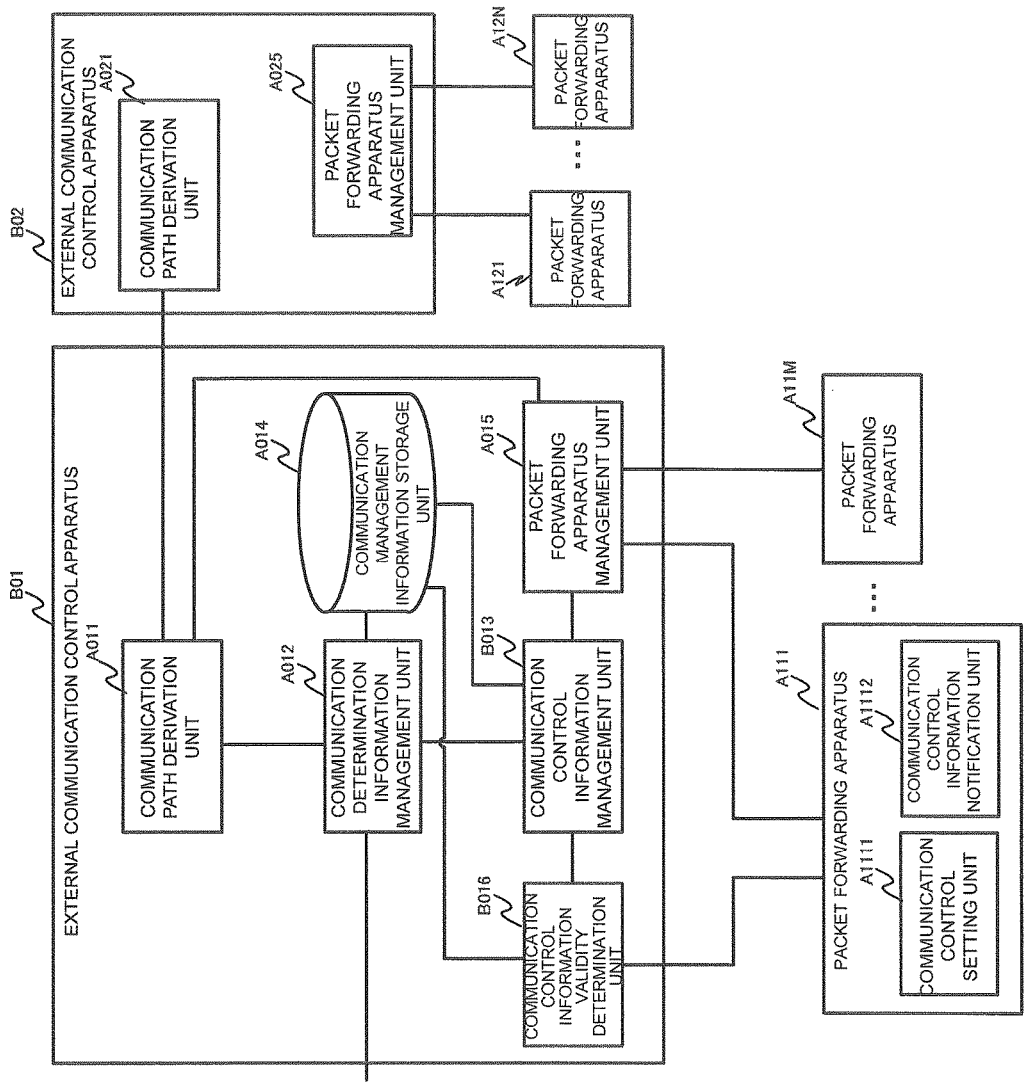
FIG. 18 illustrates a configuration according to a second exemplary embodiment of the present invention.

Next, a second exemplary embodiment of the present invention will be described in detail with reference to the drawings. FIG. 18 illustrates a configuration according to a second exemplary embodiment of the present invention. The configuration according to the present exemplary embodiment includes a communication control information validity determination unit B016 in addition to the configuration according to the first exemplary embodiment. Accordingly, the operation of the communication control information management unit A013 (represented as a communication control information management unit B013) is also changed. The following description will be made with a focus on the communication control information validity determination unit B016 and the changes.

The communication control information validity determination unit B016 determines whether communication control information is valid. More specifically, when notified of communication control information by the communication control information management unit B013 and is requested to determine whether the communication control information is valid, the communication control information validity determination unit B016 determines whether the communication control information is valid information in the system. Depending on the determination result, the communication control information validity determination unit B016 determines that the information needs to be registered, rejected, or newly adopted or determines that the information already exists. The communication control information validity determination unit B016 refers to other communication control information stored in the communication management information storage unit A014, as needed. In addition, as needed, the communication control information validity determination unit B016 performs an operation of requesting the packet forwarding apparatuses A111 to A11M to supply communication state information matching communication control information.

Next, the communication control information validity determination unit B016 transmits the determined validity result to the communication control information management unit B013.

As a first example, whether the communication control information is valid may be determined on the basis of consistency of a communication path. For example, the communication control information validity determination unit B016 uses topology information or the like to determine whether a setting of a packet forwarding apparatus(es) under the management of the external communication control apparatus causes a loop. If so, the communication control information validity determination unit B016 determines that the communication control information is invalid. In another example, if it can clearly be determined that communication packets will not be delivered on the basis of a setting content of a packet forwarding apparatus(es) under the management of the external communication control apparatus, namely, if it can be determined that the communication control information will not be utilized, the communication control information validity determination unit B016 determines that the communication control information is invalid. In such cases, it is predicted that communication failure could be caused sooner or later. In such cases, the communication control information validity determination unit B016 rejects the communication control information received from the packet forwarding apparatuses A111 to A11M. If the communication control information corresponds to a new communication path setting, an existing communication path is determined to be incorrect. Thus, the communication control information validity determination unit B016 may determine that the communication control information needs to be newly adopted, instead of rejecting the communication control information.

As a second example, whether the communication control information is valid may be determined by monitoring the communication state for a certain time and determining presence of communication evidence. In such case, use evidence may be checked by coordinating with the packet forwarding apparatuses A111 to A11M and acquiring statistical information for a certain time, for example. If use evidence is found, the communication control information validity determination unit B016 determines that communication is continuously performed and registers the communication control information. In contrast, if no use evidence is found, the communication control information validity determination unit B016 determines that the communication has already been terminated and rejects the communication control information received from the packet forwarding apparatuses A111 to A11M as information that no longer needs to be stored. In this method, too, if the communication control information corresponds to a new communication path setting, an existing communication path is determined to be incorrect. Thus, the communication control information validity determination unit B016 may determine that the communication control information needs to be newly adopted, instead of rejecting the communication control information.

As a third example, whether the communication control information is valid may be determined by performing matching that uses arbitrary identifiers registered in the communication determination information or the communication control information. For example, in OpenFlow or the like, a packet forwarding rule includes a region in which an arbitrary number called Cookie can be added. By adding a system ID or the like to this arbitrary bit and determining whether the system ID matches, whether to permit or reject the communication control information can be determined.

The following functions of the communication control information management unit B013 are changed from or added to the functions of the communication control information management unit A013.

An operation of the communication control information management unit B013 performed when communication control information is extracted and the extracted communication control information is supplied from the packet forwarding apparatus management unit A015 after a packet forwarding apparatus is added is changed. When a packet forwarding apparatus is added as a packet forwarding apparatus under the management of the external communication control apparatus B01, communication control information is extracted and the extracted communication control information is supplied from the packet forwarding apparatus management unit A015 to the communication control information management unit B013. The communication control information management unit B013 transmits the communication control information to the communication control information validity determination unit B016 and causes the communication control information validity determination unit B016 to determine whether the communication control information is valid.

In addition, the following functions are added. If the communication control information validity determination unit B016 determines that communication control information is valid (registration is permitted), the communication control information management unit B013 stores the communication control information in the communication management information storage unit A014. If no related communication determination information exists, the communication control information management unit B013 requests the communication determination information management unit A012 to create communication determination information, as in the first exemplary embodiment.

If the communication control information validity determination unit B016 determines that communication control information needs to be rejected (registration is not permitted), the communication control information management unit B013 creates communication control information for deleting the communication control information and requests the packet forwarding apparatus management unit A015 to delete the communication control information. In this way, the added packet forwarding apparatus is caused to delete communication control information and to stop the communication control method corresponding to the communication control information.

In addition, when notified by the communication determination information management unit A012 of communication control information for setting a communication path, the communication control information management unit B013 also notifies the communication control information validity determination unit B016 of the communication control information and requests the communication control information validity determination unit B016 to determine whether the communication control information is valid.

As a result of the determination of the validity of the communication control information, if the communication control information validity determination unit B016 determines that the communication control information already exists, since the same information has already been registered and the communication control information has already been set, the communication control information management unit B013 does not perform any operation.

However, as a result of the determination of the validity of the communication control information, if the communication control information validity determination unit B016 determines that new communication control information is consistent with existing communication control information and that the new communication control information is valid (registration is permitted), the communication control information management unit B013 adds and registers the communication control information in the communication management information storage unit A014. Next, the communication control information management unit B013 notifies the packet forwarding apparatus management unit A015 of the new communication control information and requests the packet forwarding apparatus management unit A015 to set the communication control information.

If, as a result of the determination of the validity of the communication control information, the communication control information validity determination unit B016 determines that new communication control information is not consistent with existing communication control information, the communication control information management unit B013 deletes the existing communication control information from the communication management information storage unit A014 and requests the packet forwarding apparatus management unit A015 to make a setting for deleting the existing communication control information. Next, the communication control information management unit B013 registers the new communication control information in the communication management information storage unit A014, notifies the packet forwarding apparatus management unit A015 of the new communication control information, and requests the packet forwarding apparatus management unit A015 to set the communication control information. If the existing communication control information can be deleted by overwriting with the new communication control information or if the new communication control information can be set by changing the existing communication control information, the deletion of the existing communication control information can be omitted.

The second exemplary embodiment of the present invention is configured as described above and has the function of checking the validity of communication control information in addition to the functions according to the first exemplary embodiment.

Figure 19:
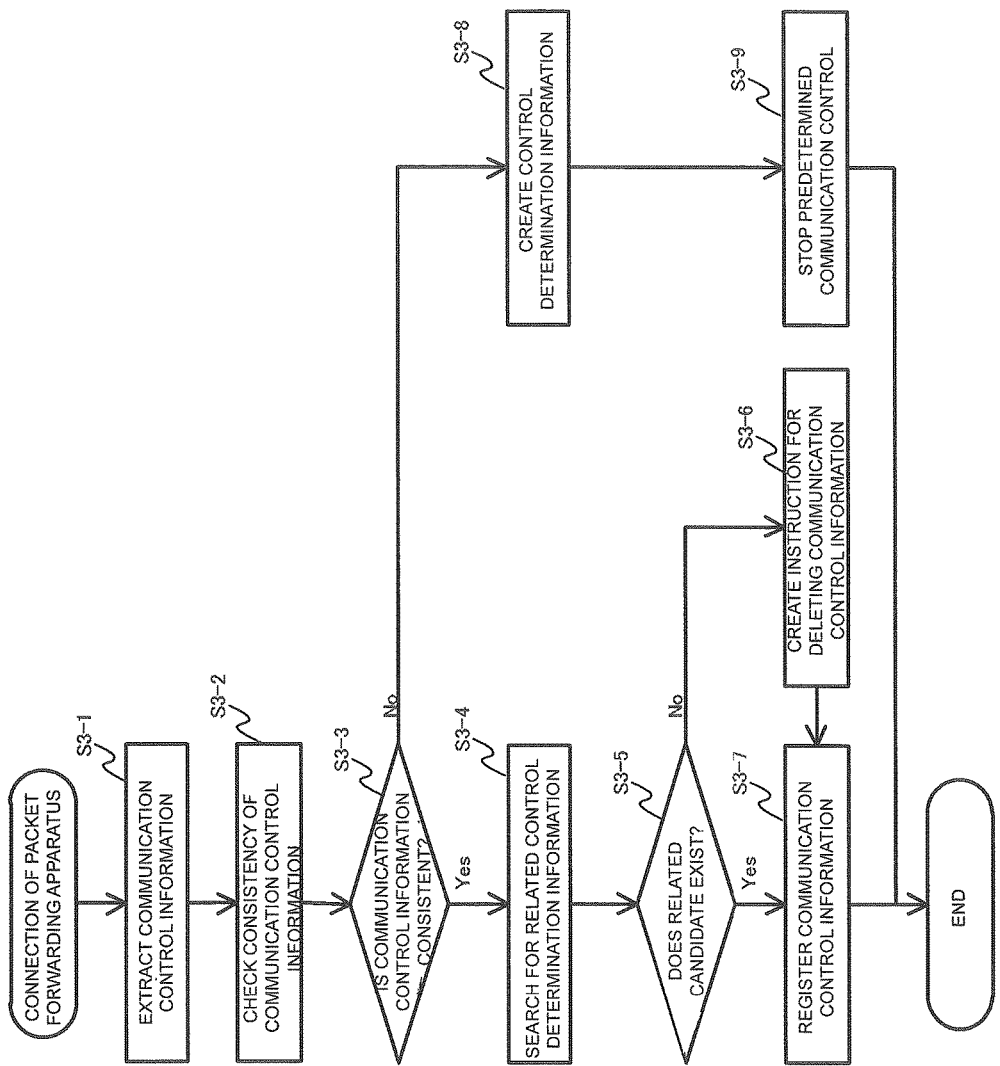
FIG. 19 is a flowchart illustrating an operation performed by an external communication control apparatus when a packet forwarding apparatus is connected according to the second exemplary embodiment of the present invention.

Next, an operation of the present exemplary embodiment will be described in detail with reference to the drawings. An operation performed when a packet forwarding apparatus is removed is the same as that according to the first exemplary embodiment. Thus, an operation performed when a packet forwarding apparatus is connected will hereinafter be described. FIG. 19 is a flowchart illustrating an operation performed by an external communication control apparatus when a packet forwarding apparatus is connected according to the second exemplary embodiment of the present invention. When the packet forwarding apparatus A111 is connected to the external communication control apparatus B01 and the managing apparatus is switched, the present procedure is started.

To manage the packet forwarding apparatus A111, the packet forwarding apparatus management unit A015 in the external communication control apparatus B01 transmits a communication control information extraction request to the packet forwarding apparatus A111. When receiving the communication control information extraction request, the packet forwarding apparatus A111 extracts communication control information set therein from the communication control information notification unit A1112 and transmits the communication control information to the packet forwarding apparatus management unit A015 (step S3-1).

When receiving the communication control information, the packet forwarding apparatus management unit A015 notifies the communication control information management unit B013 of the received communication control information. The communication control information management unit B013 notifies the communication control information validity determination unit B016 of the extracted communication control information to request to check the consistency. On the basis of the supplied communication control information, as needed, the communication control information validity determination unit B016 refers to other communication control information in the communication management information storage unit A014 or requests the packet forwarding apparatuses A111 to A11M to supply information about a communication state (use evidence) matching the communication control information, for example. In this way, the communication control information validity determination unit B016 determines whether to register the communication control information (registration is permitted/rejected) and transmits a result to the communication control information management unit B013 (step S3-2). If the communication control information validity determination unit B016 determines that the communication control information needs to be registered (already exists), since the same information has already been registered and the communication control information has already been set, the subsequent processing can be omitted.

If a result represents that the communication control information needs to be registered (YES in step S3-3), the communication control information management unit B013 searches the communication management information storage unit A014 for related communication determination information (step S3-4).

As a result of the search, if it is determined that no related communication determination information exists (No in step S3-5), the communication control information management unit B013 transmits the communication control information to the communication determination information management unit A012 and requests generation of communication determination information corresponding to the communication control information. The communication determination information management unit A012 creates communication determination information from the communication control information, registers the communication determination information in the communication management information storage unit A014, and notifies the communication control information management unit B013 of completion of the creation of the communication determination information (step S3-6).

In contrast, as a result of the search, if it is determined that related communication determination information exists (YES in step S3-5) or if generation of the communication determination information has already been completed (step S3-6), the communication control information management unit B013 registers the communication control information in the communication management information storage unit A014 (step S3-7).

In step S3-2, if a response representing that the communication control information needs to be rejected is obtained (No in step S3-3), the communication control information management unit B013 requests the packet forwarding apparatus management unit A015 to delete the corresponding communication control information (step S3-8).

Next, the packet forwarding apparatus management unit A015 requests a corresponding one(s) of the packet forwarding apparatuses A111 to A11M to delete the communication control information. When receiving the request, the corresponding one(s) of the packet forwarding apparatuses A111 to A11M deletes the communication control information stored in the corresponding one(s) of the communication control setting units A1111 to A111M in accordance with the request and stop the corresponding communication control (step S3-9).

Through the above operation, when a packet forwarding apparatus is connected, communication control information stored in the packet forwarding apparatus is extracted. If the communication control information is determined to be consistent, by using such consistent communication control information, communication determination information and communication control information in an external communication control apparatus can be extracted, restored, and merged. In contrast, if the communication control information is determined to be inconsistent, by deleting such inconsistent communication control information from a corresponding packet forwarding apparatus(es), the control information and control state in the system can be maintained accurately.

Figure 20:
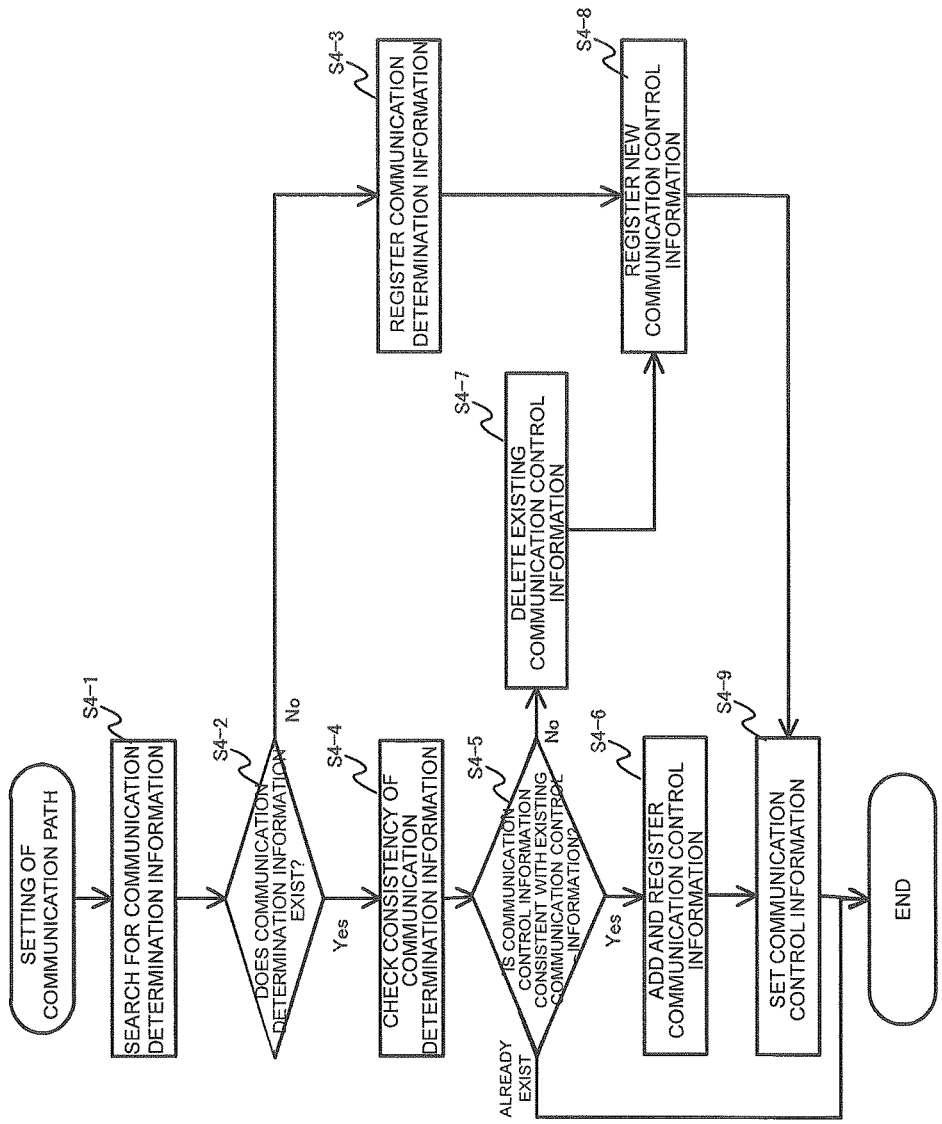
FIG. 20 is a flowchart illustrating an operation of setting a communication path performed by an external communication control apparatus when a communication path is calculated according to the second exemplary embodiment of the present invention.

FIG. 20 is a flowchart illustrating an operation of setting a communication path performed by an external communication control apparatus when a communication path is calculated according to the second exemplary embodiment of the present invention. As in the above first exemplary embodiment, the present procedure is started when a packet that does not match any existing setting is observed or when path design information is inputted and when the communication path derivation unit A011 requests setting of a communication path.

For a new communication path, the communication path derivation unit A011 generates communication determination information and communication control information including the communication determination information and notifies the communication determination information management unit A012 of the generated information. The communication determination information management unit A012 searches the communication management information storage unit A014 for the same communication determination information (step S4-1).

If the communication management information storage unit A014 does not include the same communication determination information (No in step S4-2), the communication determination information management unit A012 registers the communication determination information in the communication management information storage unit A014 and notifies the communication control information management unit B013 of the communication determination information (step S4-3).

In contrast, if, as a result of the search, it is determined that the communication management information storage unit A014 includes the same communication determination information (YES in step S4-2), the communication determination information management unit A012 notifies the communication control information management unit B013 of the communication control information. The communication control information management unit B013 notifies the communication control information validity determination unit B016 of the communication control information as new communication control information to request to check the consistency. The communication control information validity determination unit B016 refers to the communication management information storage unit A014 or the like to check whether inconsistency is caused between the new communication control information and existing communication control information (step S4-4).

As a result of the check, if the communication control information validity determination unit B016 determines that the communication control information already exists, the communication control information management unit B013 omits registration of the communication control information and the like and ends the subsequent operation ("ALREADY EXIST" in step S4-5).

If the new communication control information is consistent with the existing communication control information (YES in step S4-5), the communication control information management unit B013 registers the new communication control information in the communication management information storage unit A014. The communication control information management unit B013 notifies the packet forwarding apparatus management unit A015 of the new communication control information as the communication control information to be set (step S4-6).

If the new communication control information is determined to be inconsistent with the existing communication control information (No in step S4-5), the communication control information management unit B013 determines that the existing communication control information is incorrect and deletes the existing communication control information from the communication management information storage unit A014. Next, the communication control information management unit B013 requests the packet forwarding apparatus management unit A015 to delete the existing communication control information from the packet forwarding apparatus(es) (step S4-7).

If the communication determination information is newly registered (after step S4-3) or the inconsistent existing communication control information is deleted (after step S4-7), the communication control information management unit B013 registers the communication control information supplied from the communication determination information management unit A012 in the communication management information storage unit A014 as new communication control information. In addition, the communication control information management unit B013 notifies the packet forwarding apparatus management unit A015 of the new communication control information as the communication control information to be set (step S4-8).

Finally, in accordance with the instruction from the communication control information management unit B013, the packet forwarding apparatus management unit A015 selects a corresponding one(s) of the packet forwarding apparatuses A111 to A11M to request setting or deletion of the communication control information. On the basis of the supplied communication control information, the target packet forwarding apparatus A111 (this example assumes that the setting target is the packet forwarding apparatus A111) sets the communication control information via the communication control setting unit A1111 and starts forwarding subsequent packets in accordance with the communication control information (step S4-9).

Through the above operation, even when the communication path derivation unit A011 needs to calculate and set a new communication path, communication control consistent with existing settings and other communication control information can be updated or merged.

According to the present exemplary embodiment, in addition to the above advantageous effects according to the first exemplary embodiment, it is possible to restore/merge the communication control information in the entire system while maintaining the consistency of the communication control information. In addition, in this way, communication failure can be prevented.

Second Exemplary Embodiment

Specific Example 1

Figure 21:
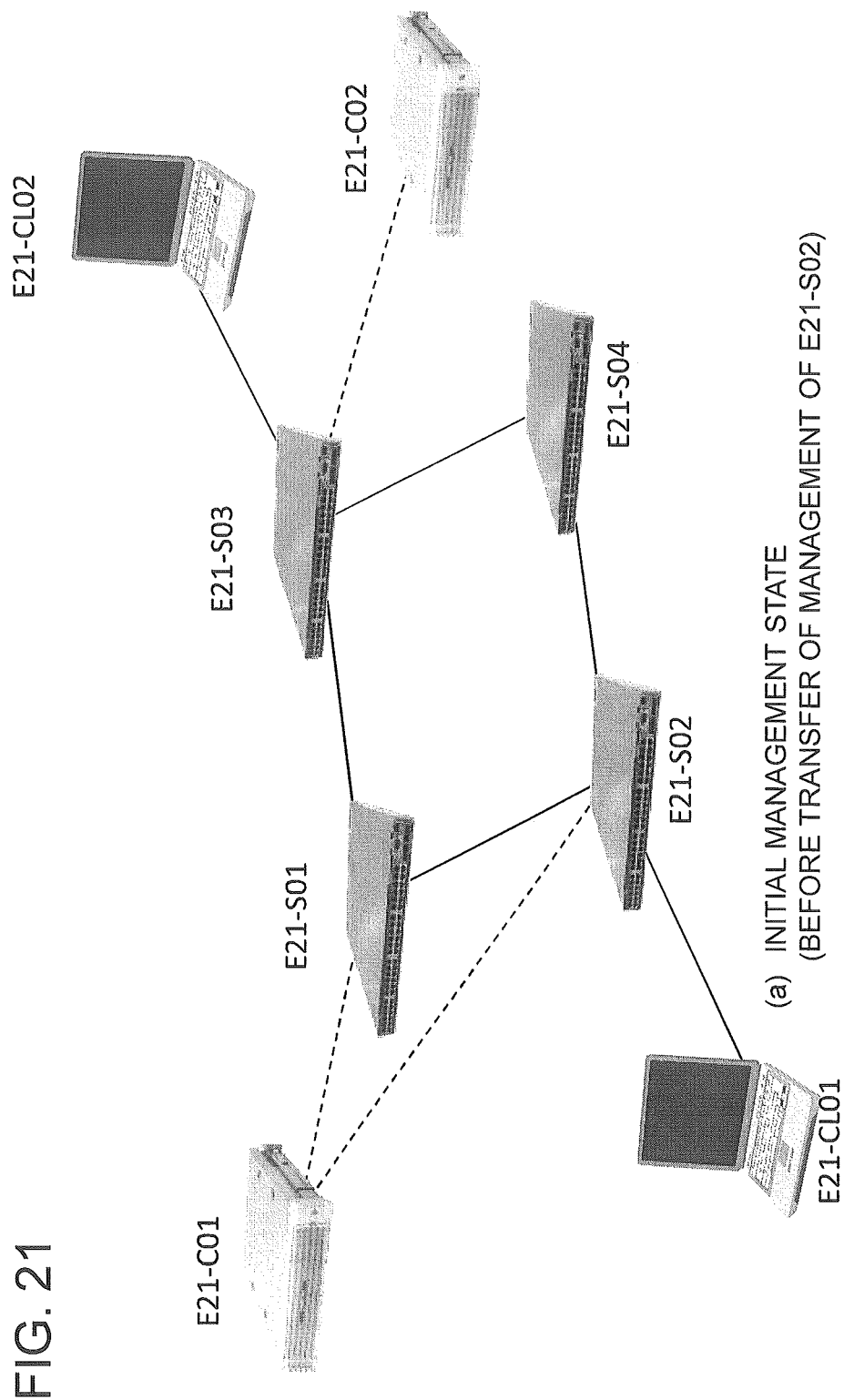
FIG. 21 illustrates a configuration of a computer network system corresponding to the second exemplary embodiment of the present invention.

Next, the above second exemplary embodiment will be described in detail on the basis of a specific configuration. FIG. 21 illustrates a configuration of a computer network system corresponding to the second exemplary embodiment of the present invention.

FIG. 21 illustrates external communication control apparatuses E21-C01 and E21-C02, packet forwarding apparatuses E21-S01 to E21-S04, and communication terminals E21-CL01 and E21-CL02. Each solid line represents a connection relationship between an apparatus and a terminal or between apparatuses. Each dashed line represents a management relationship between one of the external communication control apparatuses E21-C01 and E21-C02 and one of the packet forwarding apparatuses E21-S01 to E21-S04. Namely, in an initial state in FIG. 21, the external communication control apparatus E21-C01 manages the packet forwarding apparatuses E21-S01 and E21-S02 and the external communication control apparatus E21-C02 manages the packet forwarding apparatus E21-S03. The packet forwarding apparatus E21-S04 is not managed by any of the external communication control apparatuses.

Figure 22:
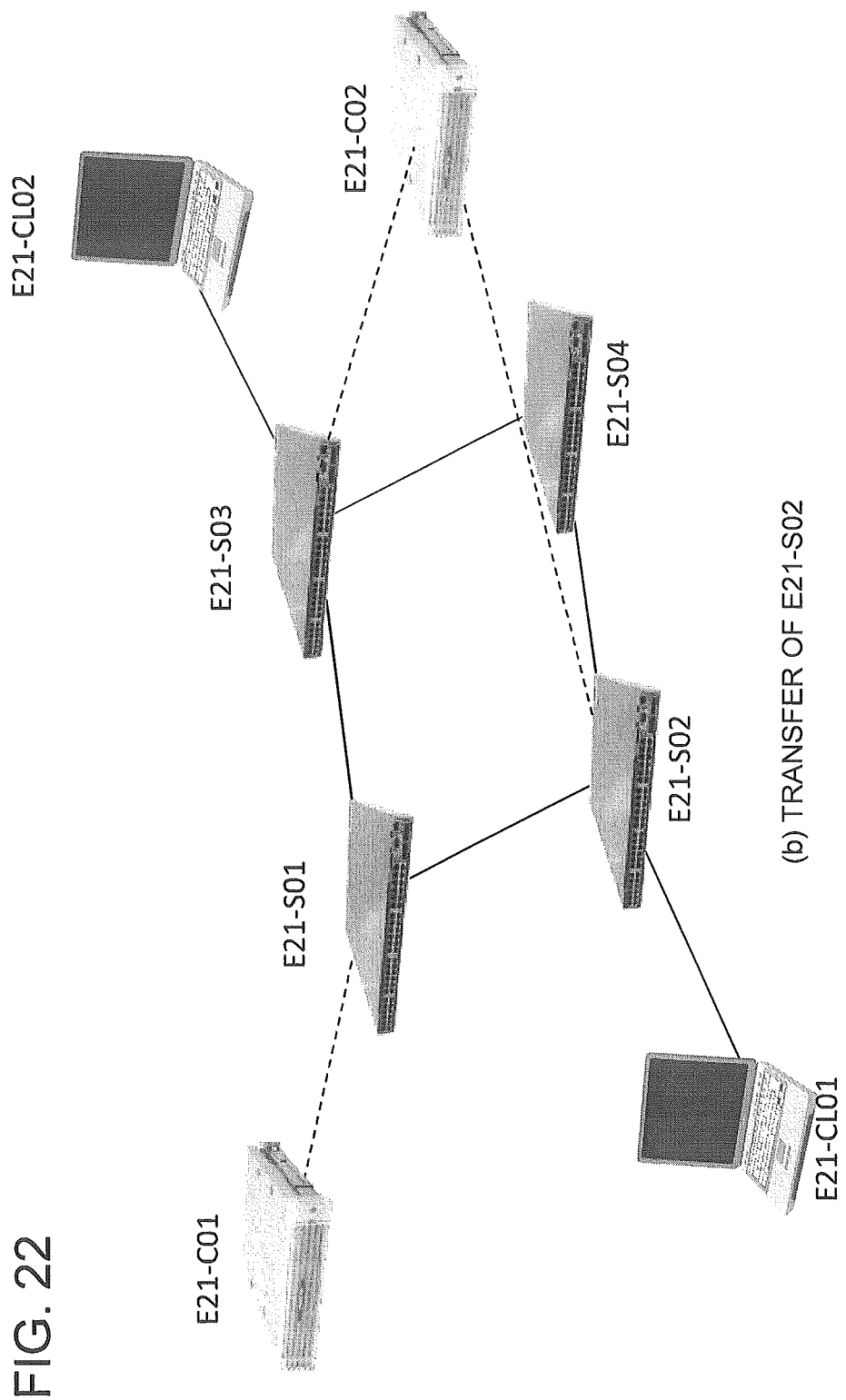
FIG. 22 illustrates a state in which an external communication control apparatus managing a packet forwarding apparatus E21-S02 has been switched in the computer network system in FIG. 21.

FIG. 22 illustrates a state that is changed from the state in FIG. 21. Namely, in FIG. 22, the apparatus managing the packet forwarding apparatus E21-S02 has been switched from the external communication control apparatus E21-C01 to the external communication control apparatus E21-C02.

Figure 23:
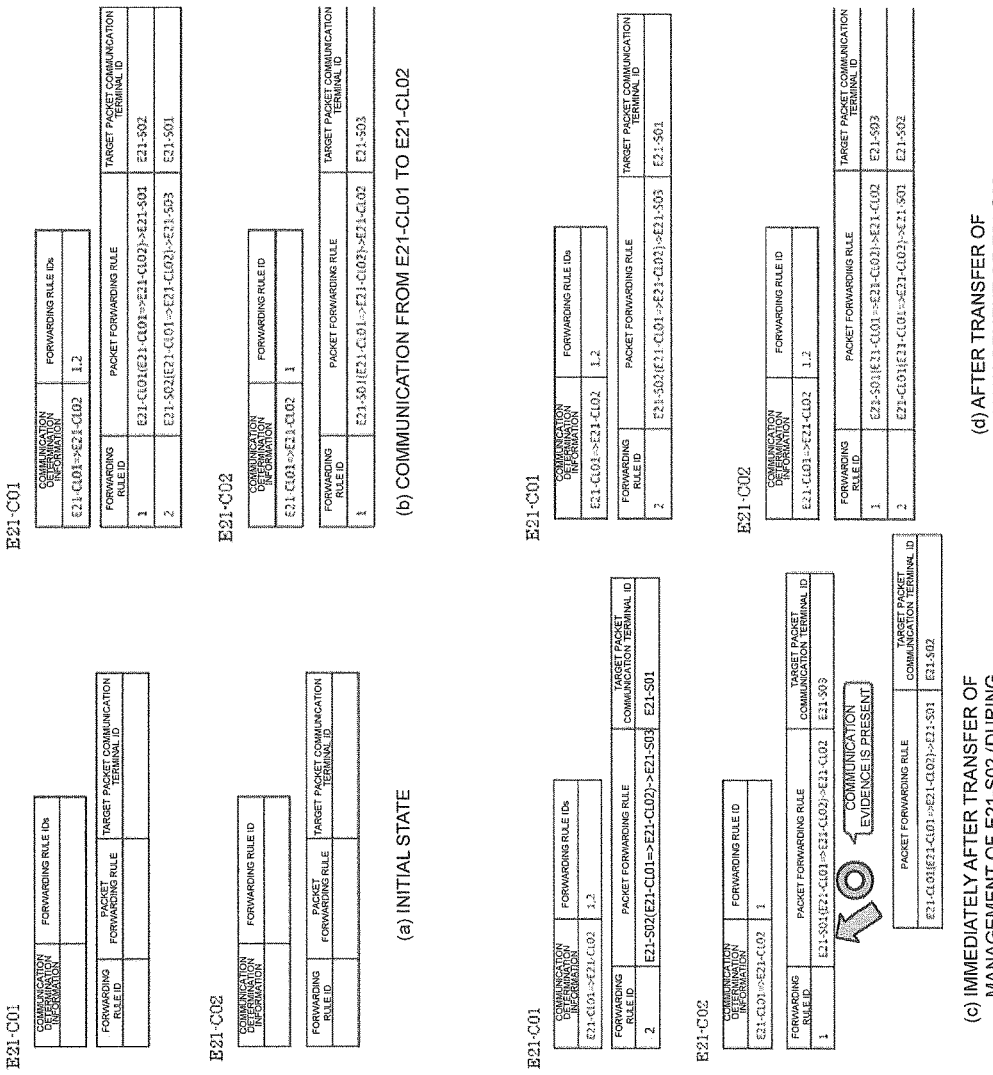
FIG. 23 is a diagram for illustrating change of communication management information in external communication control apparatuses in the computer network system in FIG. 21 (first specific example).

FIG. 23 illustrates change of communication management information in the external communication control apparatuses E21-C01 and E21-C02 in the process of the transfer from the state in FIG. 21 to the state in FIG. 22. Next, an operation will be described in detail.

When the communication terminal E21-CL01 starts communicating with the communication terminal E21-CL02, the communication path derivation units A011 in the respective external communication control apparatuses E21-C01 and E21-C02 coordinate with each other to derive a communication path. As a result, a path E21-CL01→E21-S02→E21-S01→E21-S03→E21-CL02 is derived.

The communication path derivation unit A011 in the external communication control apparatus E21-C01 notifies the communication determination information management unit A012 of communication determination information E21-CL01=>E21-CL02 and the calculated path information E21-CL01→E21-S02→E21-S01→E21-S03→E21-CL02.

The communication determination information management unit A012 searches the communication management information storage unit A014 for the communication determination information E21-CL01=>E21-CL02 (step S4-1 in FIG. 20).

Since the communication management information storage unit A014 does not include the communication determination information E21-CL01=>E21-CL02 (No in step S4-2 in FIG. 20), the communication determination information management unit A012 registers the communication determination information E21-CL01=>E21-CL02 in the communication management information storage unit A014. Next, the communication determination information management unit A012 notifies the communication control information management unit B013 of the path information E21-CL01→E21-S02→E21-S01→E21-S03→E21-CL02 (step S4-3 in FIG. 20).

By querying the packet forwarding apparatus management unit A015, the communication control information management unit B013 recognizes that the external communication control apparatus E21-C01 manages the packet forwarding apparatuses E21-S01 and E21-S02. After checking this, the communication control management unit B013 generates and stores communication control information E21-S02: E21-CL01 (E21-CL01=>E21-CL02)→E21-S01 and E2'-S01: E21-S02 (E21-CL01=>E21-CL02)→E21-S03 in the respective packet forwarding rule fields (see FIG. 23(*b*)). In addition, to associate the stored packet forwarding rules with the communication determination information, the communication control information management unit B013 registers forwarding rule ID with the communication determination information E21-CL01=>E21-CL02 (step S4-8 in FIG. 20).

The communication control information management unit B013 notifies the packet forwarding apparatus management unit A015 of the registered communication control information E1-S02: E1-CL01 (E21-CL01=>E21-CL02)→E21-S01 and E21-S01: E21-S02 (E21-CL01=>E21-CL02)→E21-S03. The packet forwarding apparatus management unit A015 notifies each of the corresponding packet forwarding apparatuses of the communication control information and causes the corresponding communication control setting units A1111 to start communication control (step S4-9 in FIG. 20).

Likewise, for the packet forwarding apparatus E21-S03, the external communication control apparatus E21-C02 performs registration of the communication determination information and communication control information and makes settings of communication control. As a result, the communication is established. Consequently, the communication management information is set in the external communication control apparatuses E21-C01 and E21-C02 as illustrated in FIG. 23(*b*).

Next a case in which the packet forwarding apparatus E21-S02 is removed from under the management of the external communication management apparatus E21-C01 and is connected to the external communication management apparatus E21-C02 as illustrated in FIGS. 21 and 22 will be described.

When the packet forwarding apparatus E21-S02 is removed from under the management of the external communication control apparatus E21-C01, the external communication control apparatus E21-C01 performs the same operation as that performed when a packet forwarding apparatus is removed according to the first exemplary embodiment of the present invention. Namely, the external communication control apparatus E21-C01 deletes the communication control information about the target packet forwarding apparatus E21-S02 from the communication management information storage unit A014. As a result, the state as illustrated by the upper portion in FIG. 23(*c*) is obtained.

Meanwhile, since the external communication control apparatus E21-C02 detects connection of the packet forwarding apparatus E21-S02, the external communication control apparatus E21-C02 starts processing for extracting and merging communication control information in accordance with the procedure illustrated in FIG. 19.

First, the packet forwarding apparatus management unit A015 in the external communication control apparatus E21-C02 requests the packet forwarding apparatus E21-S02 to transmit communication control information. The communication control information notification unit A1112 in the packet forwarding apparatus E21-S02 transmits the currently-set communication control information E21-CL01 (E21-CL01=>E21-CL02)→E21-S01 to the packet forwarding apparatus management unit A015 in the external communication control apparatus E21-C02 (step S3-1 in FIG. 19).

The packet forwarding apparatus management unit A015 notifies the communication control information management unit B013 of the received communication control information E21-S02: E21-CL01 (E21-CL01=>E21-CL02) →E21-S01. The communication control information management unit B013 notifies the communication control information validity determination unit B016 of the communication control information to request to determine the consistency.

The communication control information validity determination unit B016 refers to the communication management information storage unit A014 and checks the consistency between this communication control information E21-S02: E21-CL01 (E21-CL01=>E21-CL02)→E21-S01 and existing communication control information (step S3-2 in FIG. 19).

If the above method described as the first example of determining whether the communication control information is valid is used, it is determined that the communication control information does not have a connection point with the existing communication information E21-S03: E21-S01 (E21-CL01=>E21-CL02)→E21-CL02. In addition, the communication control information validity determination does not indicate any inconsistency, such as a possibility of causing a loop. Thus, the communication control information validity determination unit B016 determines that the communication control information E21-S02: E21-CL01 (E21-CL01=>E21-CL02)→E21-S01 can be registered. In this case, since the communication may properly be managed via the packet forwarding apparatus E21-S01 that is not under the management of the external communication control apparatus E21-C02, the registration is permitted. However, for example, more refined determination may be performed by additionally using a validity determination method described below.

If the method described as the second method of determining whether the communication control information is valid is used, the life (operation) of the communication control information E21-S03: E21-S01 (E21-CL01=>E21-CL02)→E21-CL02 is checked. The communication control information validity determination unit B016 detects whether the packet forwarding apparatus E21-S03 continues the communication to which the communication control information is applied. For example, if continuation of the communication along the accurate path can be observed as illustrated in FIG. 23(c), the communication control information validity determination unit B016 determines that the communication control information E21-S02: E21-CL01 (E21-CL01=>E21-CL02)→E21-S01 can be registered.

If the communication control information validity determination unit B016 determines that the communication control information E21-S02: E21-CL01 (E21-CL01=>E21-CL02)→E21-S01 can be registered, the communication control information validity determination unit B016 notifies the communication control information management unit B013 to that effect (Yes in step S3-3 in FIG. 19).

The communication control information management unit B013 refers to the communication management information storage unit A014 and searches for communication determination information corresponding to the communication control information E21-S02: E21-CL01 (E21-CL01=>E21-CL02)→E21-S01 (step S3-4 in FIG. 19).

In this case, as the corresponding communication determination information, the communication management information storage unit A014 in the external communication control apparatus E21-C02 includes the communication determination information E21-CL01=>E21-CL02 (Yes in step S3-5 in FIG. 19), there is no need to create new communication determination information. Thus, the communication control information management unit B013 registers the communication control information E21-S02: E21-CL01 (E21-CL01=>E21-CL02)→E21-S01 in the communication management information storage unit A014 (step S3-7 in FIG. 19; see FIG. 23(d)).

Thus, it is seen that the communication control information in the packet forwarding apparatus E21-S02 has been transferred from the external communication control apparatus E21-C01 to E21-C02 without inconsistency.

Second Exemplary Embodiment

Specific Example 2

Next, an operation in which the communication control information validity determination unit B016 determines that inconsistency is caused as a result of the determination on the validity of the communication control information will be described as specific example 2 of the second exemplary embodiment.

Figure 24:
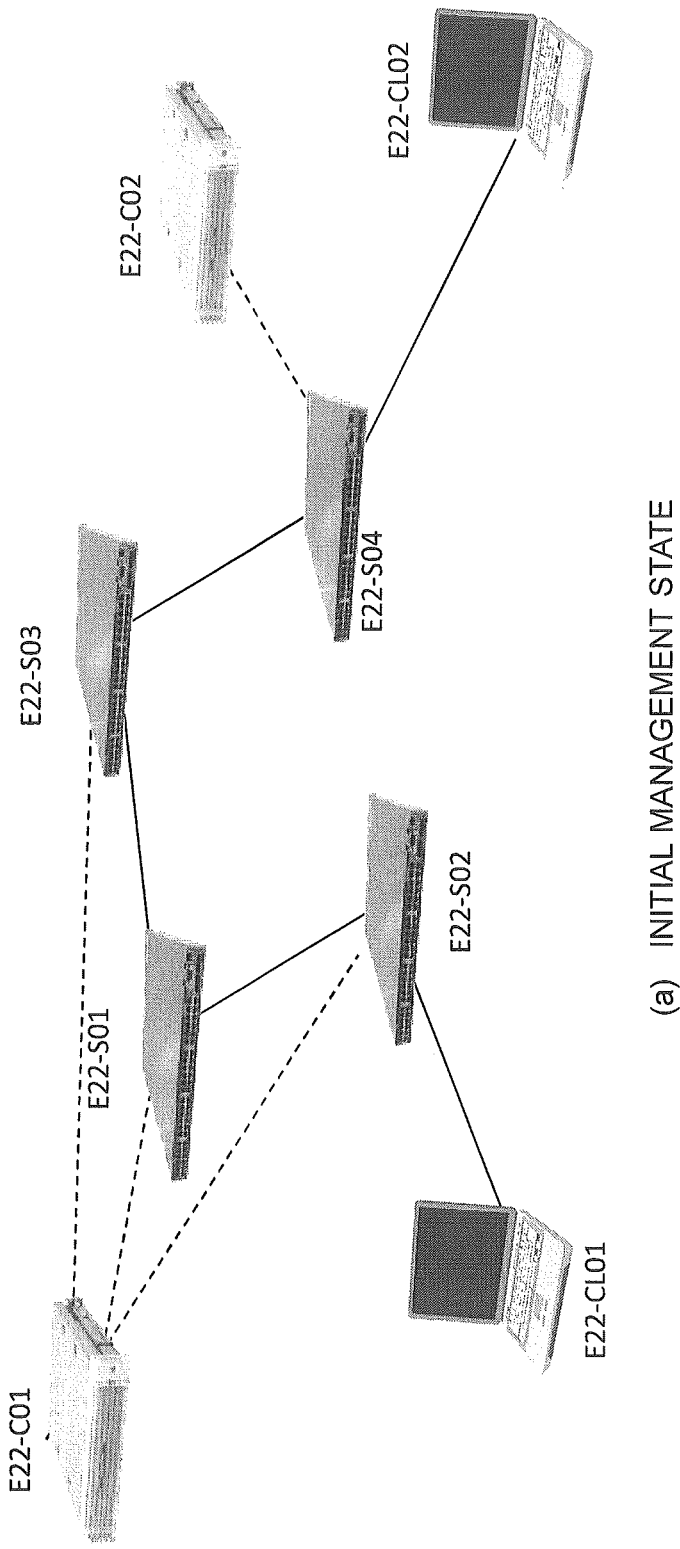
FIG. 24 illustrates a configuration of another computer network system corresponding to the second exemplary embodiment of the present invention (second specific example).

FIG. 24 illustrates another configuration of the computer network system corresponding to the second exemplary embodiment of the present invention.

FIG. 24 illustrates external communication control apparatuses E22-C01 and E22-C02, packet forwarding apparatuses E22-S01 to E22-S04, and communication terminals E22-CL01 and E22-CL02. Each solid line represents a connection relationship between an apparatus and a terminal or between apparatuses. Each dashed line represents a management relationship between one of the external communication control apparatuses E22-C01 and E22-C02 and one of the packet forwarding apparatuses E22-S01 to E22-S04. Namely, in an initial state in FIG. 24, the external communication control apparatus E22-C01 manages the packet forwarding apparatuses E22-S01 to E22-S03 and the external communication control apparatus E22-C02 manages the packet forwarding apparatus E22-S04.

Figure 25:
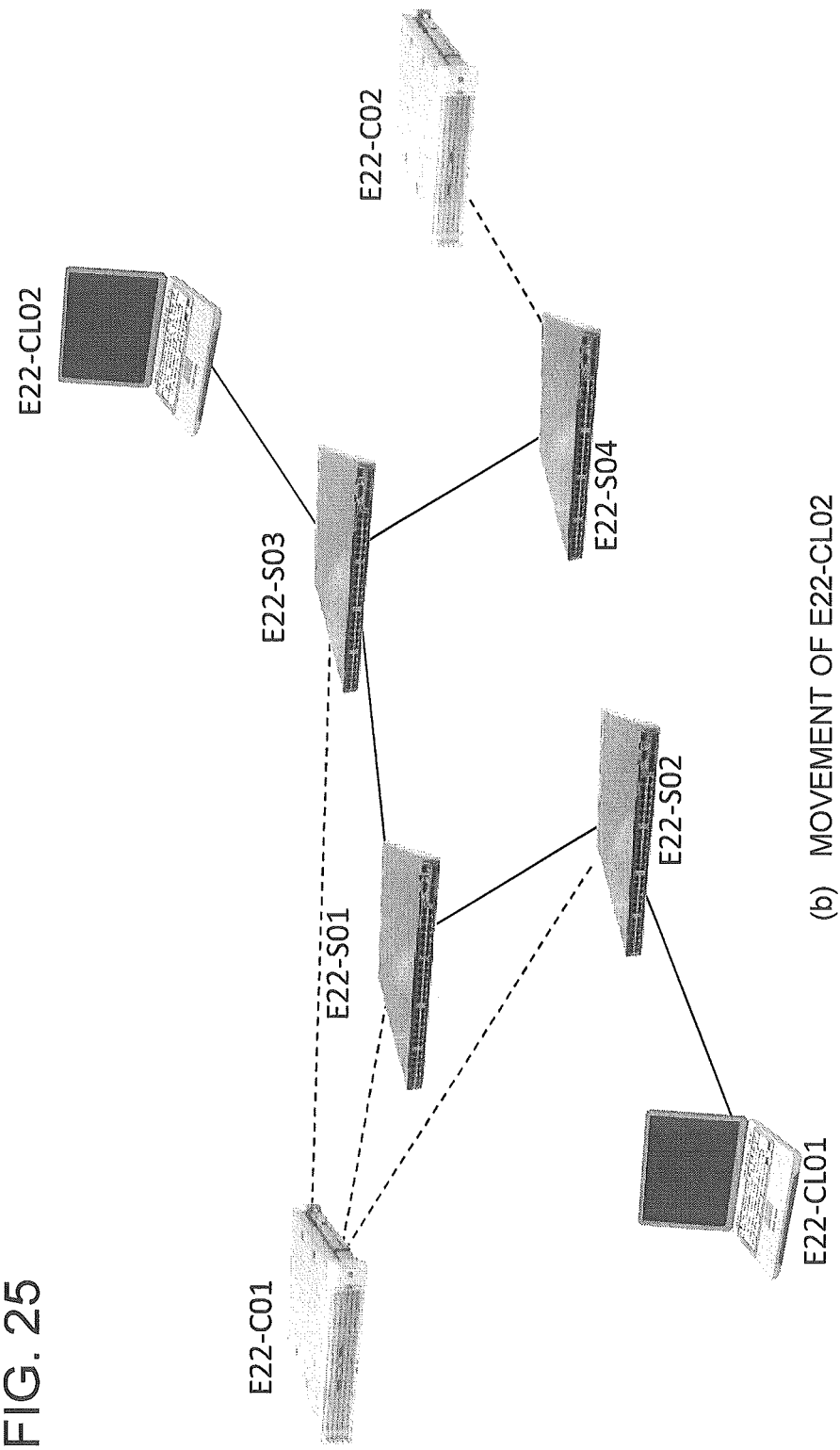
FIG. 25 illustrates a state in which client E22-CL02 has been moved in the computer network system in FIG. 24.
Figure 26:
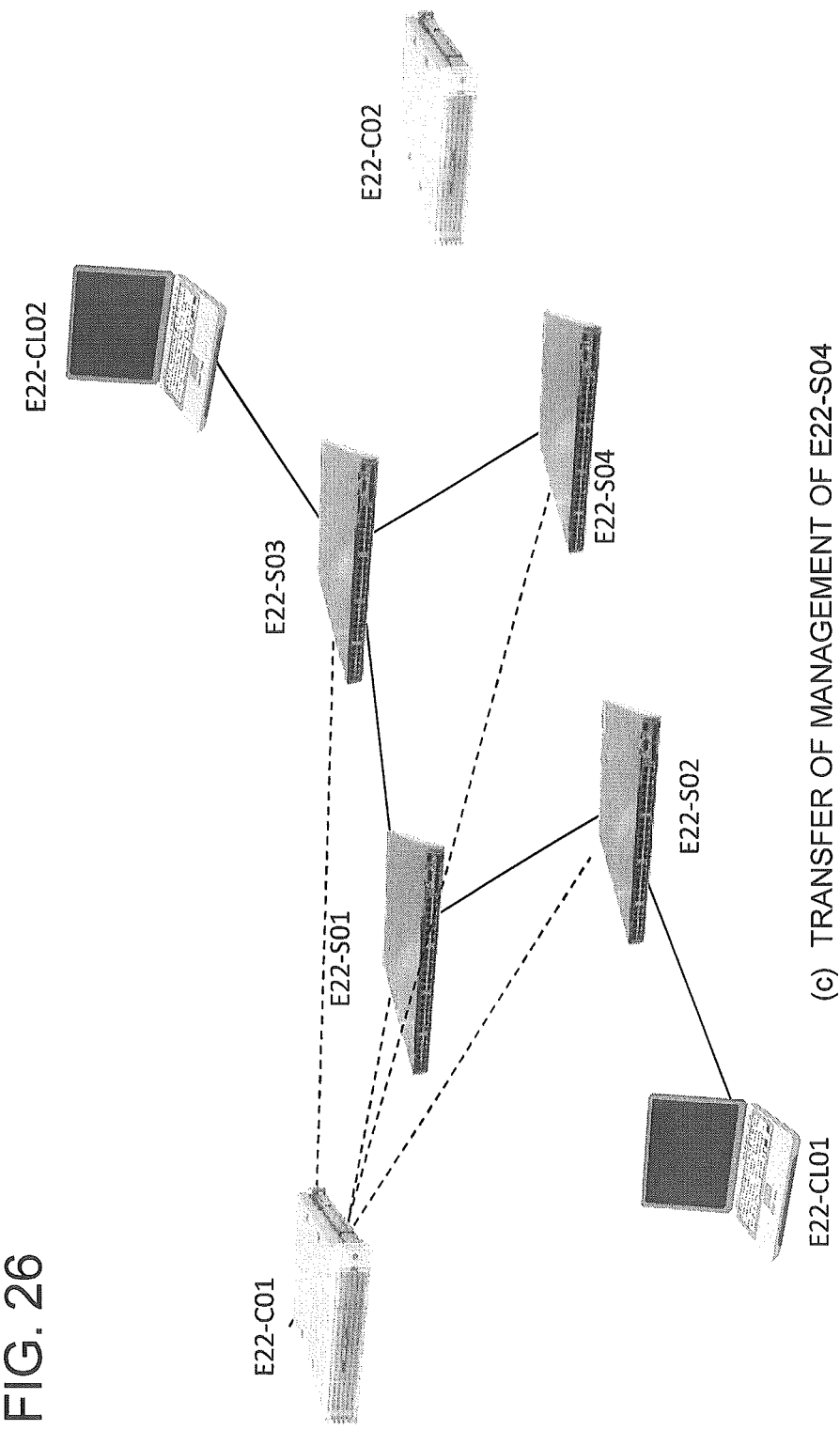
FIG. 26 illustrates a state in which an external communication control apparatus managing a packet forwarding apparatus E22-S04 has been switched from the state in FIG. 25.

FIG. 25 illustrates a state that is changed from the state in FIG. 24. Namely, the packet forwarding apparatus to which the communication terminal E22-CL02 is connected has been switched from the packet forwarding apparatus E22-S04 to E22-S03. FIG. 26 illustrates a state in which the management of the packet forwarding apparatus E22-S04 has been transferred from the external communication control apparatus E22-C02 to E22-C01 after the state in FIG. 25.

Figure 27:
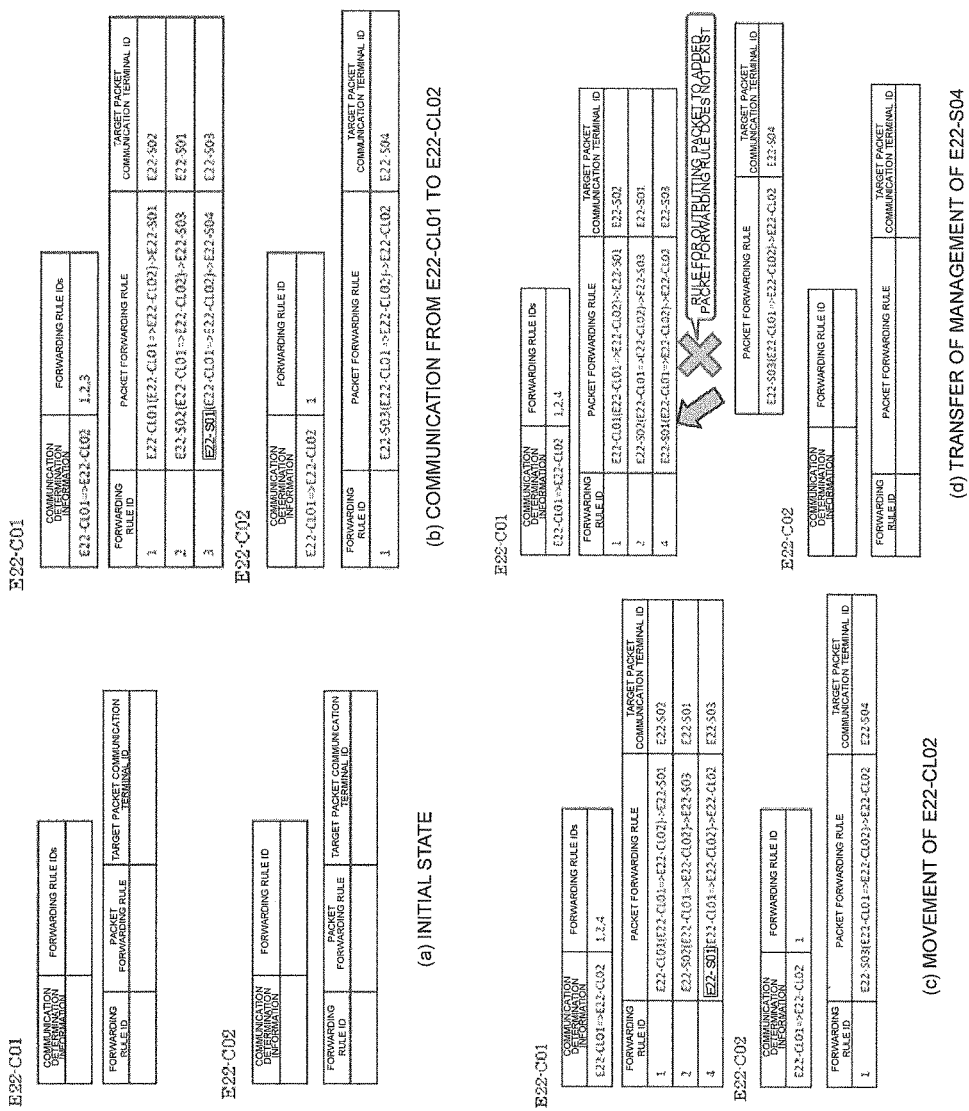
FIG. 27 is a diagram for illustrating change of communication management information in external communication control apparatuses in the computer network system in FIG. 24 (second specific example).

FIG. 27 illustrates change of communication management information in the external communication control apparatuses E22-C01 and E22-C02 in the process of the transfer from the state in FIG. 24 to the state in FIG. 26. Next, an operation will be described.

When the communication terminal E22-CL01 starts communicating with the E22-CL02, the communication path derivation units A011 in the external communication control apparatuses E22-C01 and E22-C02 derive a path E22-CL01→E22-S02→E22-S01→E22-S03→E22-S04→E22-CL02. Subsequently, as in specific example 1 of the second exemplary embodiment of the present invention, on the basis of the derived path, the external communication control apparatuses E22-C01 and E22-C02 register relevant information in the respective external communication management information storage units A014 and set relevant communication control information in each of the packet forwarding apparatuses E22-S01 to E22-S04. FIG. 27(b) illustrates a state in which a series of items of information has been registered when a communication is generated from the communication terminal E22-CL01 to E22-CL02.

Next, a case in which the packet forwarding apparatus to which the communication terminal E22-CL02 is connected has been switched from the packet forwarding apparatus E22-S04 to E22-S03 will be considered. In this case, on the basis of information about the ARP (Address Resolution Protocol) or the like, the external communication control apparatus E22-C01 detects the movement of the communication terminal E22-CL02 and establishes a communication path again.

Since the communication path derivation unit A011 in the external communication control apparatus E22-C01 can derive a path by using the packet forwarding apparatuses included in its own management range, the communication path derivation unit A011 derives a path E22-CL01→E22-S02→E22-S01→E22-S03→E22-CL02.

The communication path derivation unit A011 in the external communication control apparatus E22-C01 notifies the communication determination information management unit A012 of the communication determination information E22-CL01=>E22-CL02 and the path information E22-CL01→E22-S02→E22-S01→E22-S03→E22-CL02. The communication determination information management unit A012 determines whether the communication management information storage unit A014 includes the communication determination information E22-CL01=>E22-CL02 (step S4-1 in FIG. 20).

Since the communication management information storage unit A014 includes the communication determination information E22-CL01=>E22-CL02 (Yes in step S4-2 in FIG. 20), the communication determination information management unit A012 notifies the communication control information management unit B013 of the path information E22-CL01→E22-S02→E22-S01→E22-S03→E22-CL02.

The communication control information management unit B013 queries the packet forwarding apparatus management unit A015 and recognizes that the external communication control apparatus E22-C01 manages the packet forwarding apparatuses E22-S01 to E22-S03. After checking this, the communication control management unit B013 generates communication control information E22-S02: E22-CL01 (E22-CL01=>E22-CL02)→E21-S01, E22-S01: E22-S02 (E22-CL01=>E22-CL02)→E22-S03, and E22-S03: E22-S01 (E22-CL01=>E22-CL02)→E22-CL02 and requests the communication control information validity determination unit B016 to check the consistency of the communication control information. The communication control information validity determination unit B016 determines that the communication control information E22-S02: E22-CL01 (E22-CL01 E22-CL02)→E22-S01 and E22-S01: E22-S02 (E22-CL01=>E22-CL02)→E22-S03 already exist, that the communication control information E22-S03: E22-S01 (E22-CL01=>E22-CL02)→E22-CL02 needs to be newly registered, and that the communication control information E22-S01 (E22-CL01=>E22-CL02)→E22-S04 corresponding to the newly-registered communication control information is inconsistent control information. The communication control information validity determination unit B016 transmits these results to the communication control information management unit B013 (step S4-4 in FIG. 20).

Since the communication control information E22-S02: E22-CL01 (E22-CL01=>E22-CL02)→E22-S01 and E22-S01: E22-S02 (E22-CL01=>E22-CL02)=>E22-S03 already exists, the communication control information management unit B013 ends the processing for the information ("ALREADY EXIST" in step S4-5 in FIG. 20).

Since the communication control information E22-S03: E22-S01 (E22-CL01=>E22-CL02)→E22-CL02 is to be newly registered, the communication control information management unit B013 detects E22-S01 (E22-CL01=>E22-CL02)→E22-S04 as the existing communication control information corresponding to the newly-registered communication control information. However, E22-S03 (E22-CL01=>E22-CL02)→E22-S04 can be handled by overwriting E22-S03: E22-S01 (E22-CL01=>E22-CL02)→E22-CL02 (by rewriting the output destination E22-S04 with E22-CL02), deletion of the existing communication control information is not performed but omitted (step S4-7 in FIG. 20). The communication control information management unit B013 registers the communication control information E22-S03: E22-S01 (E22-CL01=>E22-CL02)→E22-CL02 in the communication management information storage unit A014 by overwriting the existing communication control information (step S4-8 in FIG. 20; see FIG. 27(c)).

The communication control information management unit B013 sets the communication control information E22-S03: E22-S01 (E22-CL01=>E22-CL02)→E22-CL02 in the packet forwarding apparatus E22-S03 via the packet forwarding apparatus management unit A015 to change control (step S4-9 in FIG. 20).

In this way, in response to the movement of the communication terminal E22-CL02, a new communication path is set and the communication is continued.

The external communication control apparatus E22-C02 does not detect the end of the communication or the like. Thus, for example, since the communication control is cancelled by a time-out operation or the like after discontinuation of the communication, the external communication control apparatus E22-C02 is brought in a standby state. To prevent these, a related link-down can be detected or a coordinate operation can be performed when a communication path is derived. However, the present example assumes that these operations are not performed or will be performed later. Namely, the present example assumes that the management of the packet forwarding apparatus E22-S04 is transferred from the external communication control apparatus E22-C02 to the external communication control apparatus E22-C01 as illustrated in FIGS. 25 and 26 before the communication control information is deleted.

When the packet forwarding apparatus E22-S04 is removed from under the management of the external communication control apparatus E22-C02, the external communication control apparatus E22-C02 deletes the communication control information E22-S04: E22-S03 (E22-CL01=>E22-CL02)→E22-CL02 by performing the same operation in specific example 1 of the first exemplary embodiment of the present invention (see the lower portion in FIG. 27(d)).

Next, an operation of the external communication control apparatus E22-C01 will be described in detail. The packet forwarding apparatus management unit A015 in the external communication control apparatus E22-C01 requests the packet forwarding apparatus E22-S04 to extract the communication control information therein. The communication control information notification unit A1112 in the packet forwarding apparatus management unit A015 extracts and transmits the communication control information E22-S03 (E22-CL01=>E22-CL02)→E22-CL02 managed thereby (step S3-1 in FIG. 19).

The packet forwarding apparatus management unit A015 notifies the communication control information management unit B013 of the received communication control information E22-S04: E22-S03 (E22-CL01=>E22-CL02) →E22-CL02. The communication control information management unit B013 transmits the communication control information to the communication control information validity determination unit B016 to request to check the consistency of the communication control information. Since the existing communication control information does not include communication control information for transmitting packets to the packet forwarding apparatus E22-S04, the communication control information validity determination unit B016 determines that the communication control information E22-S04: E22-S03 (E22-CL01=>E22-CL02) →E22-CL02 is inconsistent and needs to be rejected. The communication control information validity determination unit B016 notifies the communication control information management unit B013 of rejection of the communication control information E22-S04: E22-S03 (E22-CL01=>E22-CL02)→E22-CL02 (step S3-2 in FIG. 19).

If the method described as the first method of determining whether the communication control information is valid is used, the communication control information validity determination unit B016 refers to the communication management information storage unit A014 and determines that the communication control information E22-S04: E22-S03 (E22-CL01=>E22-CL02)→E22-CL02 is not consistent with the communication control information E22-S03: E22-S01 (E22-CL01=>E22-CL02)→E22-CL02. This is because the communication control information in the packet forwarding apparatus E22-S03 instructs forwarding packets to a port connected to the communication terminal E22-CL02 not to the packet forwarding apparatus E22-S04. Thus, it can be determined that no packets reach the packet forwarding apparatus E22-S04.

Likewise, if the method described as the second method of determining whether the communication control information is valid is used, no packets are forwarded to the packet forwarding apparatus E22-S04 either by an operation of the packet forwarding apparatus E22-S03. Namely, since the communication control information E22-S03: E22-S01 (E22-CL01=>E22-CL02)→E22-CL02 in the packet forwarding apparatus E22-S03 is matched, the packet forwarding apparatus E22-S04 will not be operated. Thus, by checking the life (operation), it can be determined that the packet forwarding apparatus E22-S04 is not operating.

Since the communication control information validity determination unit B016 determines that the communication control information E22-S04: E22-S03 (E22-CL01=>E22-CL02)→E22-CL02 needs to be rejected, the communication control information management unit B013 creates communication control information for instructing deletion of the communication control information (step S3-8 in FIG. 19) and transmits the created communication control information to the packet forwarding apparatus E22-S04 via the packet forwarding apparatus management unit A015. Accordingly, the packet forwarding apparatus E22-S04 deletes the communication control information set in FIG. 27(b) and stops the operation of outputting packets received from the packet forwarding apparatus E22-S03 to a port connected to the communication terminal E22-CL02, the packets addressed to the communication terminal E22-CL02 from E22-CL01 (step S3-9 in FIG. 19).

From the above operation, it can be seen that, according to the present invention, modification and extraction of inconsistent communication control information can be rejected.

Third Exemplary Embodiment

Figure 28:
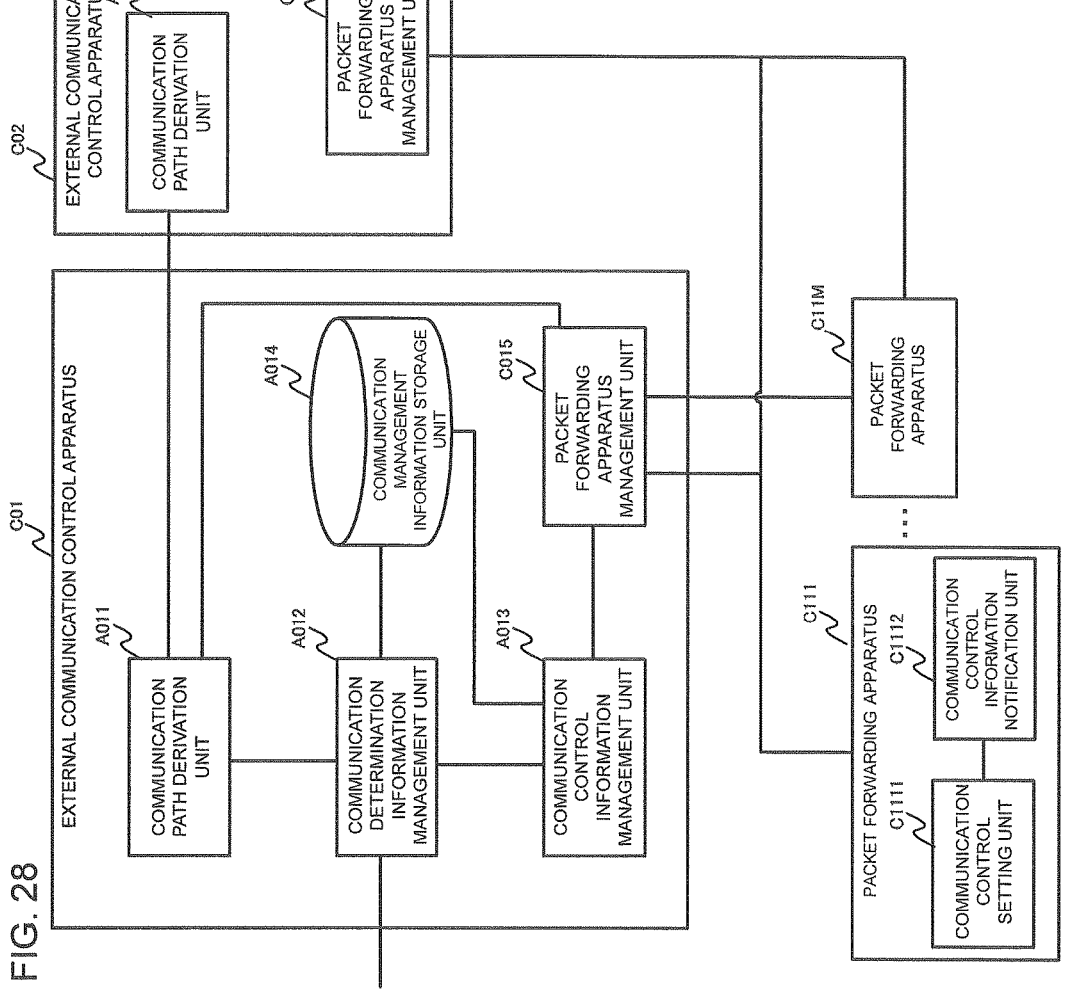
FIG. 28 illustrates a configuration according to a third exemplary embodiment of the present invention.

Next, a third exemplary embodiment of the present invention will be described in detail with reference to the drawings. FIG. 28 illustrates a configuration according to a third exemplary embodiment of the present invention. The configuration of the present exemplary embodiment differs from that of the first exemplary embodiment in that the packet forwarding apparatus management unit A015 in each external communication control apparatus is replaced by a packet forwarding apparatus management unit C015 and the communication control setting unit A1111 and the communication control information notification unit A1112 in each packet forwarding apparatus are replaced by a communication control setting unit C1111 and a communication control information notification unit C1112. The following description will be made with a focus on these differences.

The packet forwarding apparatus management unit C015 manages packet forwarding apparatuses controlled by the external communication control apparatus C01 or C02. The packet forwarding apparatus management unit C015 includes the following functions in addition to the same functions of the packet forwarding apparatus management unit A015.

Aside from the time of packet connection, when notified of new communication control information by the packet forwarding apparatus C111, the packet forwarding apparatus management unit C015 notifies the communication control information management unit A013 of the supplied communication control information.

The communication control setting unit C1111 includes the following functions in addition to the functions of the communication control setting unit A1111.

When notified of communication control information by the packet forwarding apparatus management unit C015, the communication control setting unit C1111 switches packet forwarding control on the basis of the communication control information. Simultaneously, the communication control setting unit C1111 notifies the communication control information notification unit C1112 of the communication control information to be set and an identifier determining the setter external communication control apparatus C01. Examples of the identifier determining the setter external communication control apparatus include section information and a setter address representing a communication terminal such as Layer 2/Layer3.

The communication control information notification unit C1112 includes the following functions in addition to the functions of the communication control information notification unit A1112.

When notified of the communication control information to be set and the identifier determining the setter external communication control apparatus by the communication control setting unit C1111, the communication control information notification unit C1112 refers to the identifier and notifies the packet forwarding apparatus management unit C025 in the external communication control apparatus C02, which is another external communication control apparatus connected to the packet forwarding apparatus C111 other than the setter external communication control apparatus C01, of the communication control information. In this case, for ease of description, only the external communication control apparatus C02 is arranged as another external communication control apparatus. However, a plurality of external communication control apparatuses may be arranged as other external communication control apparatuses connected to the packet forwarding apparatus C111.

In the third exemplary embodiment of the present invention, with the above configuration, each of a plurality of external communication control apparatuses has a function of sharing management information about packet forwarding apparatuses.

Figure 29:
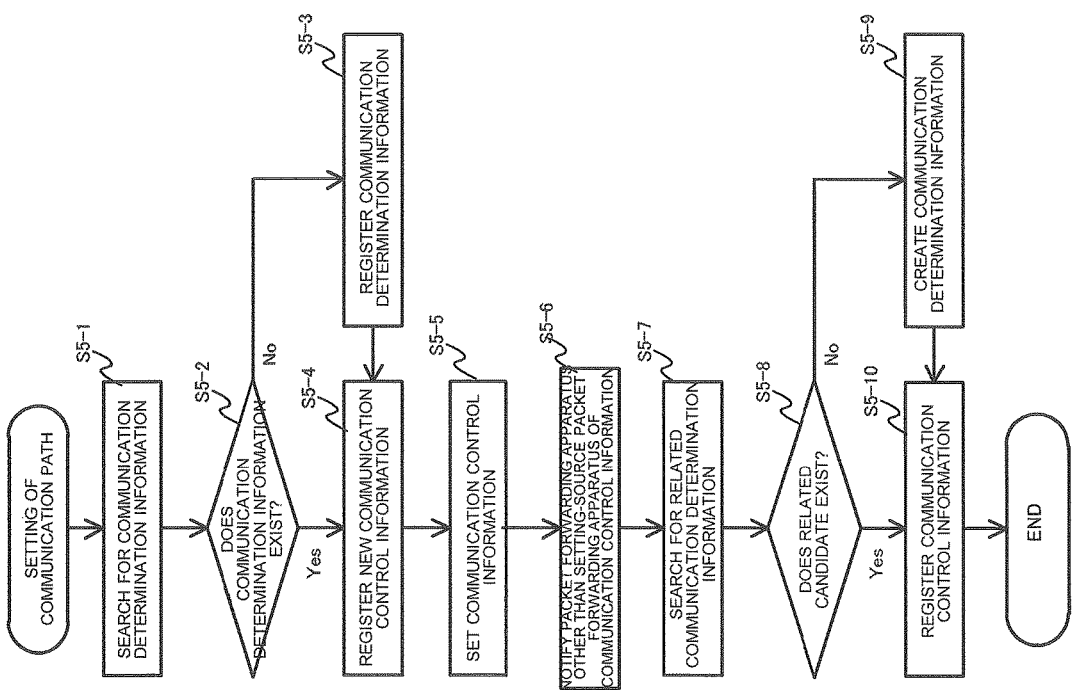
FIG. 29 is a flowchart illustrating an operation of setting a communication path performed by an external communication control apparatus when a communication path is calculated according to the third exemplary embodiment of the present invention.

Next, an operation according to the third exemplary embodiment of the present invention will be described in detail with reference to the drawings. FIG. 29 is a flowchart illustrating an operation of setting a communication path performed by an external communication control apparatus when a communication path is calculated according to the third exemplary embodiment of the present invention. When a packet forwarding apparatus is connected or removed, the same operation as that according to the first exemplary embodiment is performed. Thus, redundant description will be omitted.

As illustrated in FIG. 29, for example, when a packet that does not match any existing setting is observed or when path design information is inputted, communication path setting processing by the communication path derivation unit A011 is started.

For a new communication path, the communication path derivation unit A011 generates communication determination information and communication control information including the communication determination information and notifies the communication determination information management unit A012 of the generated information. The communication determination information management unit A012 searches the communication management information storage unit A014 for the same communication determination information as the received communication determination information (step S5-1).

As a result of the search, if it is determined that the same communication determination information as the received communication determination information does not exist (No in step S5-2), the communication determination information management unit A012 registers the communication determination information in the communication management information storage unit A014 (step S5-3).

In contrast, if the same communication determination information as the received communication determination information exists (Yes in step S5-2) or if the new communication determination information has been registered (after step S5-3), the communication determination information management unit A012 notifies the communication control information management unit A013 of the communication determination information and the communication control information including the communication determination information. On the basis of these items of information, the communication control information management unit A013 queries the packet forwarding apparatus management unit C015 and acquires information about a management-target packet forwarding apparatus(es). The acquired information is registered in the communication management information storage unit A014 as the communication control information about such management-target packet forwarding apparatus(es) (step S5-4).

The communication control information management unit A013 notifies the packet forwarding apparatus management unit C015 of the registered communication control information. The packet forwarding apparatus management unit C015 refers to the supplied communication control information, selects at least one of the packet forwarding apparatuses C111 to C11M, and notifies the selected setting-target packet forwarding apparatus(es) of the supplied communication control information. The communication control setting unit C1111 in the target packet forwarding apparatus C111 (this example assumes that the setting target is the packet forwarding apparatus C111) stores the supplied communication control information and starts packet forwarding in accordance with the communication control information (step S5-5).

In addition, the communication control setting unit C1111 in the packet forwarding apparatus C111 notifies the communication control information notification unit C1112 of the set communication control information and the identifier of the setter external communication control apparatus C01 to request to notify the external communication control apparatus C02 other than the setter external communication control apparatus C01 of the communication control information. The packet forwarding apparatus management unit C025 in the external communication control apparatus C02 receives the communication control information (step S5-6).

When notified of the communication control information, the packet forwarding apparatus management unit C025 in the external communication control apparatus C02 notifies a communication control information management unit (which is not illustrated and which corresponds to the communication control information management unit A013) of the supplied communication control information. The communication control information management unit (which is not illustrated and which corresponds to the communication control information management unit A013) searches a communication management information storage unit (which is not illustrated and which corresponds to the communication management information storage unit A014) for related communication determination information (step S5-7).

As a result of the search, if it is determined that related communication determination information does not exist (No in step S5-8), the communication control information management unit (which is not illustrated and which corresponds to the communication control information management unit A013) notifies a communication determination information management unit (which is not illustrated and which corresponds to the communication determination information management unit A012) of the communication control information to generate communication determination information corresponding to the communication control information. The communication determination information management unit (which is not illustrated and which corresponds to the communication determination information management unit A012) creates communication determination information from the communication control information, registers the communication determination information in the communication management information storage unit (which is not illustrated and which corresponds to the communication management information storage unit A014), and notifies the communication control information management unit (which is not illustrated and which corresponds to the communication control information management unit A013) of the creation of the communication determination information (step S5-9).

In contrast, as a result of the search, if it is determined that the communication management information storage unit (not illustrated and which corresponds to the communication management information storage unit A014) includes related communication determination information (Yes in step S5-8) or if communication determination information has been generated (step S5-9), the communication control information management unit (which is not illustrated and which corresponds to the communication control information management unit A013) registers the communication control information in the communication management information storage unit (which is not illustrated and which corresponds to the communication management information storage unit A014) (step S5-10).

Through the above operation, the communication management information can be updated and set when a communication path is calculated. Simultaneously, an external communication control apparatus other than the external communication control apparatus setting the communication control information can extract, restore, and merge the communication determination information and the communication control information.

According to the present exemplary embodiment, the following advantageous effects can be provided in addition to those provided by the above first exemplary embodiment. First, a communication can be controlled and managed by a plurality of external communication control apparatuses. Namely, a plurality of external communication control apparatuses can be allocated to a single packet forwarding apparatus. Since a packet forwarding apparatus has a backup external communication control apparatus, when a request for a new communication setting or the like is made, such request can immediately be accommodated.

As another variation of the present exemplary embodiment, packet forwarding apparatuses or external communication control apparatuses may determine main and sub external communication control apparatuses managing the packet forwarding apparatuses. In this way, the main-management external communication control apparatus can set a communication path.

Third Exemplary Embodiment

Specific Example 1

Figure 30:
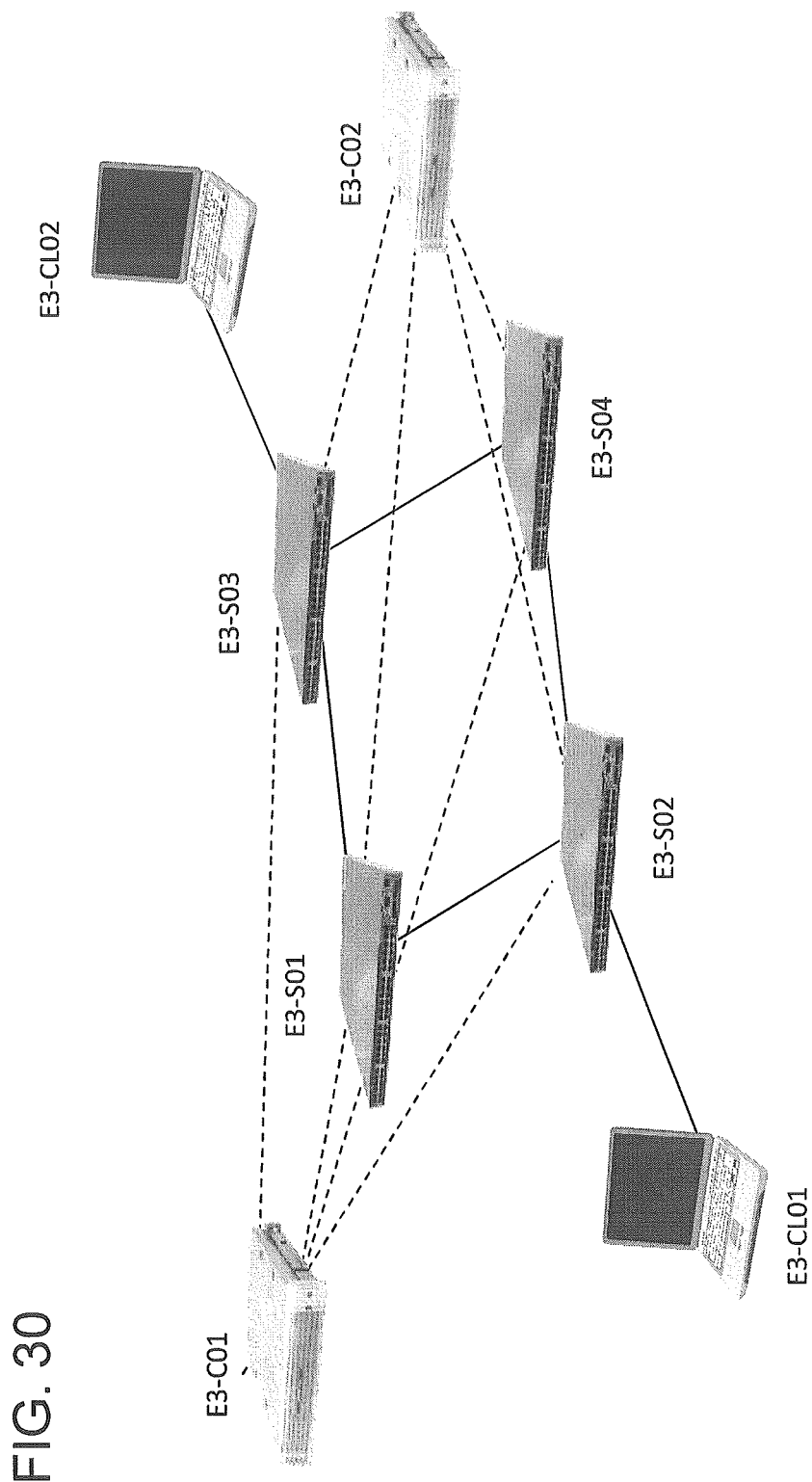
FIG. 30 illustrates a configuration of a computer network system corresponding to the third exemplary embodiment of the present invention.

Next, the third exemplary embodiment will be described in detail on the basis of a specific configuration. FIG. 30 illustrates a configuration of a computer network system corresponding to the third exemplary embodiment of the present invention. Each of the external communication control apparatuses E3-C01 and E3-C02 manages packet forwarding apparatuses E3-S01 to E3-S04. This example will be described assuming that the external communication control apparatus E3-C01 mainly manages the packet forwarding apparatuses, communication terminals E3-CL01 and E3-CL02 are connected to packet forwarding apparatuses E3-S02 and E3-S03, respectively, and a communication is started from the communication terminal E3-CL01 to the communication terminal E3-CL02.

Figure 31:
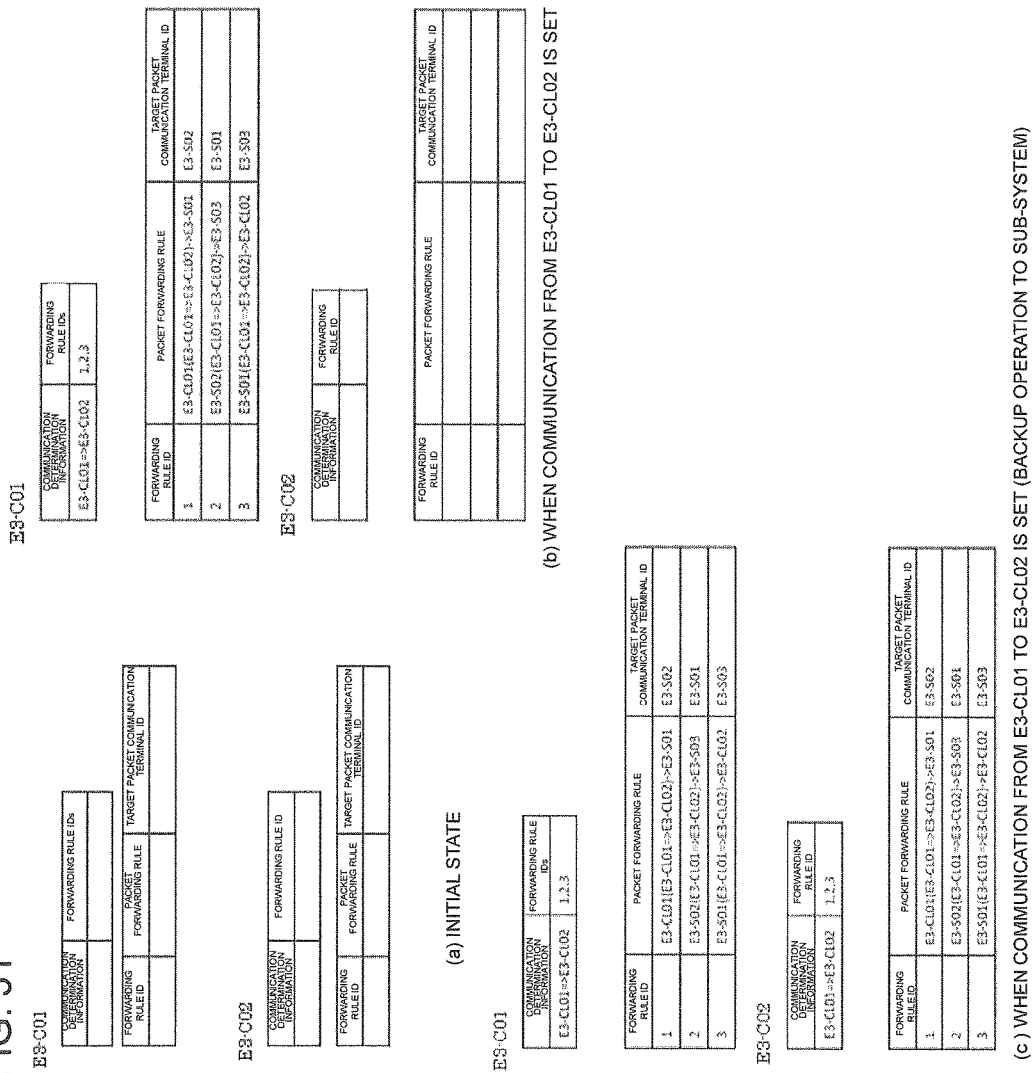
FIG. 31 is a diagram for illustrating change of communication management information in external communication control apparatuses in the computer network system in FIG. 30 (first specific example).

FIG. 31 illustrates change of communication management information stored in the external communication control apparatuses E3-C01 and E3-C02.

When the communication terminal E3-CL01 starts communicating with the communication terminal E3-CL02, the packet forwarding apparatus E3-S02 recognizes the communication and requests the external communication control apparatus E3-C01 performing the main management to make settings for the communication. Since the external communication control apparatus E3-C01 can perform packet forwarding by using the packet forwarding apparatuses under the management thereof, the communication path derivation unit A011 in the external communication control apparatus E3-C01 calculates a communication path E3-CL01→E3-S02→E3-S01→E3-S03→E3-CL02.

The communication path derivation unit A011 in the external communication control apparatus E3-C01 notifies the communication determination information management unit A012 of communication determination information E1-CL01=>E1-CL02 and the path information E3-CL01→E3-S02→E3-S01→E3-S03→E3-CL02. The communication determination information management unit A012 searches the communication management information storage unit A014 for the communication determination information E1-CL01=>E1-CL02 (step S5-1 in FIG. 29).

In this case, the communication determination information E1-CL01=>E1-CL02 does not exist, the communication determination information management unit A012 registers the communication determination information E1-CL01=>E1-CL02 in the communication management information storage unit A014 (No in step S5-2 to step S5-3 in FIG. 29).

After registering the communication determination information, the communication determination information management unit A012 notifies the communication control information management unit A013 of the path information E3-CL01→E3-S02→E3-S01→E3-S03→E3-CL02. The communication control information management unit A013 associates each item of the communication control information E3-S02: E3-CL01 (E3-CL01=>E3-CL02)→E3-S01, E3-S01: E3-S02 (E3-CL01=>E3-CL02)→E3-S03, E3-S03: E3-S01 (E3-CL01=>E3-CL02)→E3-CL02 with the communication determination information E1-CL01=>E1-CL02 and stores the associated information in the communication management information storage unit A014 (step S5-4 in FIG. 29). In addition, the communication control information management unit A013 notifies the corresponding packet forwarding apparatuses E3-S02, E3-S01, and E3-S03 of the communication control information via the packet forwarding apparatus management unit C015 to request to set the communication control information. The packet forwarding apparatuses E3-S02, E3-S01, and E3-S03 cause the respective communication control setting units C1111 to make the communication control settings. As a result, the communication from the communication terminal E3-CL01 to the communication terminal E3-CL02 is established (step S5-5 in FIG. 29). In this way, each item of the communication control information is registered as illustrated in FIG. 31(b).

The communication control setting units C1111 in the packet forwarding apparatuses E3-S02, E3-S01, and E3-S03 notify the respective communication control information notification units C1112 of the communication setting information that has been set and request the respective communication control information notification units C1112 to notify the external communication control apparatus E3-C02, which is the external communication control apparatus other than the setter external communication control apparatus E3-C01, of the communication control information that has been set. The communication control information notification units C1112 in the packet forwarding apparatuses E3-S02, E3-S01 and E3-S03 notify the packet forwarding apparatus management unit C025 in the external communication control apparatus E3-C02 of the communication control information that has been set (step S5-6 in FIG. 29).

The packet forwarding apparatus management unit C025 notifies a communication control information management unit (which corresponds to the communication control information management unit A013) in the external communication control apparatus E3-C02 of the supplied communication control information E3-S02: E3-CL01 (E3-CL01=>E3-CL02)→E3-S01, E3-S01: E3-S02 (E3-CL01=>E3-CL02)→E3-S03, and E3-S03: E3-S01 (E3-CL01=>E3-CL02)→E3-CL02.

The communication control information management unit (which corresponds to the communication control information management unit A013) searches a communication management information storage unit (which corresponds to the communication management information storage unit A014) in the external communication control apparatus E3-C02 for corresponding communication determination information (step S5-7 in FIG. 29).

In this case, since corresponding communication determination information E3-CL01=>E3-CL02 does not exist, the communication control information management unit (which corresponds to the communication control information management unit A013) in the external communication control apparatus E3-C02 notifies communication determination information management unit (which corresponds to the communication determination information management unit A012) of the communication control information. The communication determination information management unit (which corresponds to the communication determination information management unit A012) creates communication determination information E3-CL01=>E3-CL02 from the communication control information and registers the created communication determination information in the communication management information storage unit (which corresponds to communication management information storage unit A014) (step S5-9 in FIG. 29).

In addition, the communication determination information management unit (which corresponds to the communication determination information management unit A012) notifies the communication control information management unit (which corresponds to the communication control information management unit A013) of the created communication determination information E3-CL01=>E3-CL02, and the communication control information management unit (which corresponds to the communication control information management unit A013) registers the communication determination information E3-S02: E3-CL01 (E3-CL01=>E3-CL02)→E3-S01, E3-S01: E3-S02 (E3-CL01=>E3-CL02)→E3-S03, and E3-S03: E3-S01 (E3-CL01=>E3-CL02)→E3-CL02 in the communication management information storage unit (which corresponds to the communication management information storage unit A014) (step S5-10 in FIG. 29). In this way, the communication management information as illustrated in FIG. 31(c) is obtained.

As described above, it is seen that, according to the present exemplary embodiment, the communication determination information and the communication control information has been supplied without direct synchronization between the main and sub external communication control apparatuses. In this way, for example, even if the main external communication control apparatus malfunctions, the management can be switched to the sub external communication control apparatus. Thus, the malfunction can be promptly dealt with and the communication control can be continued.

Fourth Exemplary Embodiment

Lastly, a fourth exemplary embodiment of the present invention in which the above second and third exemplary embodiments are combined will be described. A basic configuration of the fourth exemplary embodiment is different in that a communication control information validity determination unit is added to an external communication control apparatus according to the third exemplary embodiment and that a communication control information management unit requests the communication control information validity determination unit to check communication control information. Next, the fourth exemplary embodiment will be described on the basis of a specific example.

Fourth Exemplary Embodiment

Specific Example 1

Figure 32:
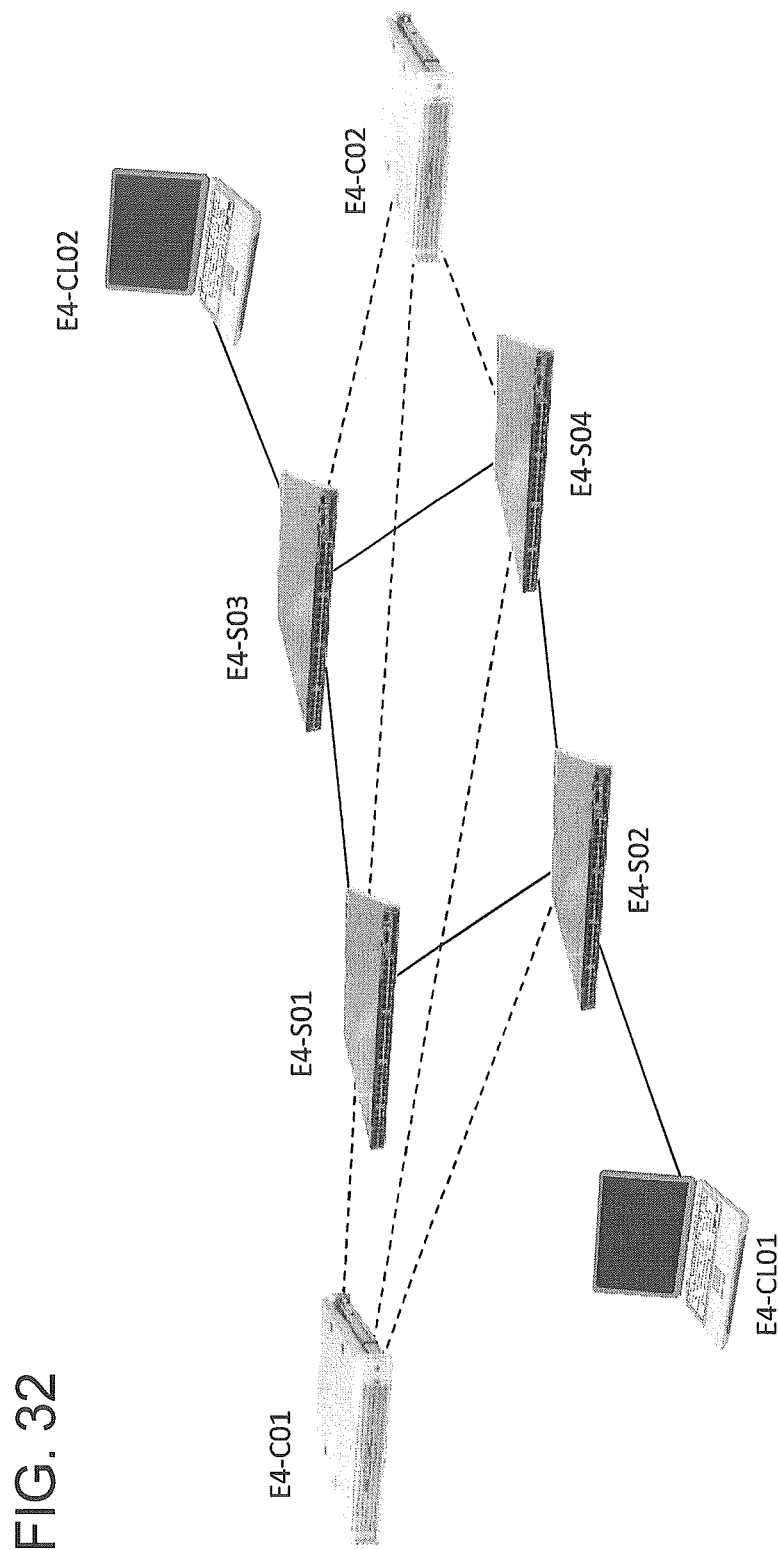
FIG. 32 illustrates a configuration of another computer network system corresponding to a fourth exemplary embodiment of the present invention (first specific example).

FIG. 32 illustrates a configuration of a computer network system corresponding to the fourth exemplary embodiment of the present invention. FIG. 32 illustrates external communication control apparatuses E4-C01 and E4-C02, packet forwarding apparatuses E4-S01 to E4-S04, and communication terminals E22-CL01 and E22-CL02. Each solid line represents a connection relationship between an apparatus and a terminal or between apparatuses. Each dashed line represents a management relationship between one of the external communication control apparatuses E4-C01 and E4-C02 and one of the packet forwarding apparatuses E4-S01 to E4-S04. In an initial state, the external communication control apparatus E4-C01 manages the packet forwarding apparatuses E4-S01, E4-S02, and E4-S04 and the external communication control apparatus E4-C02 manages the packet forwarding apparatuses E4-S01, E4-S03, and E4-S04. In the present specific example, unlike the third exemplary embodiment, the main and sub external communication control apparatuses are not determined. In addition, the present specific example will be described assuming that the communication path calculation derivation units A011 in the external communication control apparatuses do not operate in coordination with each other as in the above specific example.

Next, an operation of each of the apparatuses performed in the process of setting a communication from the communication terminal E22-CL01 to E22-CL02 will be described. FIG. 33 illustrates change of communication management information stored in the external communication control apparatuses E4-C01 and E4-C02. The present example will be described assuming that observation of the ARP or the like has already been performed and that each external communication control apparatus has already recognized the output direction.

When the communication terminal E22-CL01 communicates with the communication terminal E22-CL02, a communication path needs to be established. The communication is established from the packet forwarding apparatus E4-S02 as a starting node connected to the communication terminal E4-CL01.

When data is outputted to the communication terminal E4-CL02, since the communication path derivation unit in the external communication control apparatus E4-C01 has already recognized that the data is outputted to the packet forwarding apparatus E4-S03 via the packet forwarding apparatus E4-S01, the communication path derivation unit calculates the communication path E4-CL01→E4-S02→E4-S01→E4-S03.

As in the operation of setting a communication path according to the second exemplary embodiment of the present invention, since each item of communication control information can be registered in the communication management information storage unit A014 in the external communication control apparatus E4-C01 without causing inconsistency, the external communication control apparatus E4-C01 registers each item of the information and sets the communication control information in each of the packet forwarding apparatuses E4-S02 and E4-S01. Simultaneously, as in the operation of setting a communication path according to the third exemplary embodiment of the present invention, the packet forwarding apparatus E4-S01 transmits the set communication control information E4-S01: E4-S02 (E4-CL01=>E4-CL02)→E4-S03 to the external communication control apparatus E4-C02, which is an external communication control apparatus other than the external communication control apparatus E4-C01. In this way, as illustrated in FIG. 33(b), the communication control information E4-S01: E4-S02 (E4-CL01=>E4-CL02)→E4-S03 is also registered in the communication management information storage unit in the external communication control apparatus E4-C02.

While the communication from the communication terminal E4-CL01 to E4-CL02 reaches the packet forwarding apparatus E4-S03 via the packet forwarding apparatus E4-S01, it is determined that the communication after the packet forwarding apparatus E4-S03 cannot be controlled. Thus, a communication is established from the packet forwarding apparatus E4-S03 as a starting point.

When data is outputted to the communication terminal E4-CL02, since the communication path derivation unit in the external communication control apparatus E4-C02 has already recognized that the data is outputted to a port of the packet forwarding apparatus E4-S03 directly connected to the communication terminal E4-CL02, the communication path derivation unit calculates a communication path E4-S01→E4-S03→E4-CL02. As in the operation of setting a communication path according to the second exemplary embodiment of the present invention, it is determined that the communication control information E4-S03: E4-S01 (E4-CL01=>E4-CL02)→E4-CL02 can be registered in the communication management information storage unit in the external communication control apparatus E4-C02 without causing inconsistency with E4-S01: E4-S02 (E4-CL01=>E4-CL02)→E4-S03. More specifically, since it is determined that this connection forms a single communication path, the communication control information E4-S03: E4-S01 (E4-CL01=>E4-CL02)→E4-CL02 is registered. In this way, as illustrated in FIG. 33(c), the communication control information E4-S03: E4-S01 (E4-CL01=>E4-CL02)→E4-CL02 is registered in the communication management information storage unit in the external communication control apparatus E4-C02.

As described above, by utilizing merging of communication control information determined to be consistent according to the second exemplary embodiment of the present invention, a communication path can be set without causing the individual external communication control apparatuses to coordinate with each other. In addition, by utilizing the duplication of communication control information according to the third exemplary embodiment of the present invention, it is possible to create a backup system with an external communication control apparatus to which a packet forwarding apparatus such as the packet forwarding apparatus E4-S01 can be connected and to create a communication path setting that does not cause inconsistency within each control range. In this way, each external communication control apparatus does not need to perform processing with other external communication control apparatuses for cooperative operations.

The disclosure of each of the above NPLs is incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the claims of the present invention. That is, the present invention of course includes various variations and modifications that could be made by those skilled in the art according to the overall disclosure including the claims and the technical concept.

In Japanese, a noun can represent the singularity and plurality. Therefore, a term in singular form also represents the plurality.

10A, 10B control apparatus
11A, 11B communication apparatus
101 communication apparatus control unit
111 control information notification unit
A01, A02, B01, B02, C01, C02, E1-C01, E1-C02, E21-C01, E21-C02, E22-C01, E22-C02, E3-C01, E3-C02, E4-C01, E4-C02 external communication control apparatus
A011, A021 communication path derivation unit
A012 communication determination information management unit
A013, B013 communication control information management unit
A014 communication management information storage unit
A015, A025, C015, C025 packet forwarding apparatus management unit A111 to A11M, A121 to A12N, C111 to C11M, E1-S01 to E1-S04, E21-S01 to E21-S04, E22-S01 to E22-S04, E3-S01 to E3-S04, E4-S01 to E4-S04 packet forwarding apparatus
A1111, C1111 communication control setting unit
A1112, C1112 communication control information notification unit
B016 communication control information validity determination unit
E1-CL01, E1-CL02, E21-CL01, E21-CL02, E22-CL01, E22-CL02, E3-CL01, E3-CL02, E4-CL01, E4-CL02 communication terminal
P0 port

What is claimed is:

1. A communication system, comprising:
a plurality of communication apparatuses that process a received packet(s) based on externally-set communication control information; and
a plurality of control apparatuses that set the communication control information in the plurality of communication apparatuses,
wherein, when a first control apparatus that sets the communication control information in a first communication apparatus is replaced by a second control apparatus, a control information notification unit in the first communication apparatus notifies the second control apparatus of the communication control information that was set in the first communication apparatus by the first control apparatus, and
the second control apparatus thereafter takes over control of the first communication apparatus by using the notified communication control information received from the first communication apparatus,
wherein the plurality of control apparatuses further comprise a communication control information validity determination unit that determines whether the notified communication control information is consistent with communication control information that has already been set in the plurality of communication apparatuses, and the determination is made based on whether a loop of a packet is caused by using the notified communication control information in setting of a packet forwarding apparatus under the control of the communication control information validity determination unit by reference to topology information constituted by packet.

2. A communication system, comprising:

a plurality of communication apparatuses that process a received packet(s) based on externally-set communication control information; and a plurality of control apparatuses that set the communication control information in the plurality of communication apparatuses, wherein, when a first control apparatus that sets the communication control information in a first communication apparatus is replaced by a second control apparatus, a control information notification unit in the first communication apparatus notifies the second control apparatus of the communication control information that was set in the first communication apparatus by the first control apparatus, and the second control apparatus thereafter takes over control of the first communication apparatus by using the notified communication control information received from the first communication apparatus, wherein the plurality of control apparatuses further comprise a communication control information validity determination unit that determines whether the notified communication control information is consistent with communication control information that has already been set in the plurality of communication a apparatuses, and the determination is made based on whether non-arrival of a packet is caused by reference to the notified communication control information that is set in a packet forwarding apparatus under the control.

3. The communication system according to claim 1, wherein the communication control information validity determination unit makes the determination based on whether communication corresponding to the notified communication control information is continuing by acquiring statistic information for a prescribed period of time.

4. The communication system according to claim 1, wherein the communication control information validity determination unit makes the determination based on whether an identifier included in the communication control information matches an identifier in communication control information that has already been set in the plurality of communication apparatuses.

5. The communication system according to claim 1, wherein the communication control information is configured to comprise communication determination information for determining a communication to be controlled and a processing content(s) applied to a packet(s) matching the communication determination information, the communication control information and the processing content(s) being associated with each other.

6. The communication system according to claim 1, wherein the communication determination information is configured to comprise a combination of identifiers representing end nodes of communication.

7. The communication system according to claim 1, wherein the communication determination information comprises station information.

8. A communication apparatus, connected to a plurality of control apparatuses setting communication control information in the communication apparatus, the communication apparatus comprising:

a packet processing unit that processes a received packet (s) based on communication control information set by at least one of the plurality of control apparatuses; and a control information notification unit that notifies, when the at least one control apparatus, which sets the communication control information in the communication apparatus, is replaced by another control apparatus, the another control apparatus as replaced of the communication control information set in the communication apparatus, wherein the plurality of control apparatuses further comprise a communication control information validity determination unit that determines whether the notified communication control information is consistent with communication control information that has already been set in the plurality of communication apparatuses, and the determination is made based on whether a loop of a packet is caused by using the notified communication control information in setting of a packet forwarding apparatus under the control of the communication control information validity determination unit by reference to topology information constituted by packet forwarding apparatus(es) under the control.

9. A control apparatus, comprising:

at least one data port so that the control apparatus can be configured to be connected to a plurality of communication apparatuses processing a received packet(s) based on externally-set communication control information; and a communication apparatus control unit, as implemented by a processor on the control apparatus, so that the control apparatus can be configured to take over control of a communication apparatus by using communication control information that had been previously set in the communication apparatus by another control apparatus and that is notified to the control apparatus by the communication apparatus, wherein the plurality of control apparatuses further comprise a communication control information validity determination unit that determines whether the notified communication control information is consistent with communication control information that has already been set in the plurality of communication apparatuses, and the determination is made based on whether a loop of a packet is caused by using the notified communication control information in setting of a packet forwarding apparatus under the control of the communication control information validity determination unit by reference to topology information constituted by packet forwarding apparatus(es) under the control.

10. A method for controlling a communication apparatus processing received packets based on externally-set communication control information, the method comprising:

by a first control apparatus, setting the communication control information in the communication apparatus;

by the communication apparatus, when the first control apparatus setting the communication control information in the communication apparatus is replaced by a second control apparatus, notifying the second control apparatus of the communication control information set in the communication apparatus by the first control apparatus; and by the second control apparatus, starting control of the communication apparatus by using the notified communication control information, wherein the first and second control apparatuses further comprise a communication control information validity determination unit that determines whether the notified communication control information is consistent with communication control information that has already been set in the first and second communication apparatuses, and the determination is made based on whether a loop of a packet is caused by using the notified communication control information in setting of a packet forwarding apparatus under the control of the communication control information validity determination unit by reference to topology information constituted by packet forwarding apparatus(es) under the control.

11. A non-transitory computer-readable recording medium storing a program that causes a computer on a communication apparatus that is connected to a plurality of control apparatuses, each control apparatus configured for potentially setting communication control information in the communication apparatus, the communication apparatus processing received packets based on communication control information set by at least one of the plurality of control apparatuses, to execute:

detecting whether the at least one control apparatus which sets the communication control information in the communication apparatus is replaced; and notifying, when the at least one control apparatus which sets the communication control information in the communication apparatus is replaced by another control apparatus, the another control apparatus of the communication control information set in the communication apparatus by the at least one control apparatus, wherein the plurality of control apparatuses further comprise a communication control information validity determination unit that determines whether the notified communication control information is consistent with communication control information that has already been set in the plurality of communication apparatuses, and the determination is made based on whether a loop of a packet is caused by using the notified communication control information in setting of a packet forwarding apparatus under the control of the communication control information validity determination unit by reference to topology information constituted by packet forwarding apparatus(es) under the control.

12. A non-transitory computer-readable recording medium, storing a program, that causes a computer, which is mounted on a control apparatus connected to a plurality of communication apparatuses processing a received packet(s) based on externally-set communication control information, to execute:

receiving communication control information from a communication apparatus controlled by another control apparatus; and starting control of the communication apparatus by using the communication control information, wherein the control apparatus further comprises a communication control information validity determination unit that determines whether the notified communication control information is consistent with communication control information that has already been set in the communication apparatus, and the determination is made based on whether a loop of a packet is caused by using the notified communication control information in setting of a packet forwarding apparatus under the control of the communication control information validity determination unit by reference to topology information constituted by packet forwarding apparatus(es) under the control.

13. A non-transitory computer-readable recording medium storing a program that causes a computer on a control apparatus connected to a communication apparatus processing received packets based on externally-set communication control information to execute:

receiving communication control information from the communication apparatus; and updating a state of communication control information that is stored in the control apparatus and that is set for the communication apparatus based on the received communication control information from the communication apparatus, wherein the control apparatus further comprise a communication control information validity determination unit that determines whether the notified communication control information is consistent with communication control information that has already been set in the communication apparatus, and the determination is made based on whether a loop of a packet is caused by using the notified communication control information in setting of a packet forwarding apparatus under the control of the communication control information validity determination unit by reference to topology information constituted by packet forwarding apparatus(es) under the control.

14. The communication system according to claim 1, wherein if the notified communication control information is not consistent with communication control information that has already been set in the plurality of communication apparatuses, the plurality of control apparatuses discard the notified communication control information.

15. The communication system according to claim 2, wherein if the notified communication control information is not consistent with communication control information that has already been set in the plurality of communication apparatuses, the plurality of control apparatuses discard the notified communication control information.

* * * * *